(12) United States Patent
Heimann et al.

(10) Patent No.: US 6,331,509 B1
(45) Date of Patent: *Dec. 18, 2001

(54) CORROSION RESISTANT LUBRICANTS, GREASES, AND GELS

(75) Inventors: Robert L. Heimann, Stoutsville; Nancy M. Heimann, Centralia; William M. Dalton, Moberly; Donald W. Taylor, Liberty; Todd W. Scrivens, Maysville, all of MO (US)

(73) Assignee: Elisha Technologies Co LLC, Moberly, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,319

(22) Filed: Mar. 27, 2000

Related U.S. Application Data

(63) Continuation-in-part of application No. 09/370,346, filed on Aug. 6, 1999, which is a continuation-in-part of application No. 09/130,790, filed on Aug. 7, 1998, now Pat. No. 6,010,985, which is a continuation-in-part of application No. 09/045,450, filed on Mar. 20, 1998, now Pat. No. 6,017,857, which is a continuation-in-part of application No. 09/016,461, filed on Jan. 30, 1998, now Pat. No. 6,010,984

(60) Provisional application No. 60/045,466, filed on May 2, 1997, and provisional application No. 60/036,026, filed on Jan. 31, 1997.

(51) Int. Cl.$^7$ .................... C10M 113/12; C10M 113/08
(52) U.S. Cl. .................... 508/136; 508/137; 508/138; 508/141; 508/181; 508/491
(58) Field of Search .................... 508/136, 137, 508/138, 141, 181, 491

(56) References Cited

U.S. PATENT DOCUMENTS

| | | | | |
|---|---|---|---|---|
| 5,871,668 | * | 2/1999 | Heimann et al. | 252/389.62 |
| 5,938,976 | * | 8/1999 | Heimann et al. | 252/389.62 |
| 6,010,984 | * | 1/2000 | Heimann et al. | 508/136 |
| 6,010,985 | * | 1/2000 | Heimann et al. | 508/136 |
| 6,017,857 | * | 1/2000 | Heimann et al. | 508/136 |
| 6,080,334 | * | 1/2000 | Heimann et al. | 252/389.62 |

* cited by examiner

Primary Examiner—Margaret Medley
(74) Attorney, Agent, or Firm—Michael K. Boyer

(57) ABSTRACT

The disclosure relates to improved gel/grease compositions as well as grease compositions capable of imparting improved corrosion resistance. The grease includes a silica/silicate mixture that can imparts a relatively high pH and corrosion resistant properties to the grease.

20 Claims, 1 Drawing Sheet

CORROSION RESISTANT LUBRICANTS, GREASES, AND GELS

The subject matter herein is a continuation-in-part of U.S. patent application Ser. No. 09/370,346, filed on Aug. 6, 1999 that is a continuation in part of Ser. No. 09/130,790, filed on Aug. 7, 1998 now U.S. Pat. No. 6,010,985 that is a continuation in part of Ser. No. 09/045,450, filed on Mar. 20, 1998, now U.S. Pat. No. 6,017,857 that in turn is a continuation-in-part of U.S. patent application Ser. No. 09/016,461, filed on Jan. 30, 1998 now U.S. Pat. No. 6,010,984 and entitled "Corrosion Resistant Lubricants, Greases and Gels". The subject matter herein also claims benefit under 35 U.S.C. 111(a), 35 U.S.C. 119(e) and 35 U.S.C. 120 of Provisional Patent Application Serial No. 60/045,466, filed on May 2, 1997; and U.S. Provisional Patent Application Serial No. 60/036,026, filed on Jan. 31, 1997; both of which are entitled "Corrosion Resistant Lubricants, Greases, and Gels". The disclosure of the aforementioned Provisional and Non-Provisional Patent Applications is hereby incorporated by reference.

FIELD OF THE INVENTION

The instant invention relates to improved grease compositions as well as grease compositions capable of imparting improved corrosion resistance.

BACKGROUND OF THE INVENTION

The American Society for Testing and Materials (ASTM D288 standard definition of the terms relating to petroleum) defines a lubricating grease as a solid to semi-fluid product of dispersion comprising a thickening agent and a liquid lubricant. Other ingredients imparting special properties may be included. This definition indicates that a grease is a liquid lubricant thickened in order to provide properties that are not provided solely by the liquid lubricant. Typically, greases are employed in dynamic rather than static applications. Gels are normally classified as a colloid and provide utility in non-dynamic applications ranging from sol-gels to cosmetic applications.

Conventional grease formulations are described in "Synthetic Lubricants and High-Performance Functional Fluids", edited by Ronald L. Shubkin (dated 1993). The characteristics of soap based greases, additives and methods for making conventional greases are described in "The Chemistry of Soap Base Greases" by Glen Brunette, "Additives For Grease", by Dr. Miles Hutchings and "Grease Manufacture in Conventional Kettles" by K. F. Montgomery all of which were presented at the 63rd NLGI Annual Meeting, October 1996. The disclosure of the previously identified publications is hereby incorporated by reference.

Commercial industrial practice employs lubricating films and greases to prevent galling and fretting. The increased efficiency and complexity of modern machines often require such films and greases to perform under severe operating and environmental conditions. While the composition of a gel may be similar to a grease, typically gels are employed to solve non-lubricating problems. There is a need in this art for lubricants, greases and gels that also impart corrosion resistance.

SUMMARY OF THE INVENTION

The instant invention solves problems associated with conventional lubricants and greases by providing an improved composition which imparts corrosion and microbial resistance, and a high dropping point. By "dropping point" it is intended to mean the temperature at which lubricating compositions become fluid and thereby able to drip through an orifice in accordance with ASTM D2265. The inventive grease typically has a minimum dropping point of about 250° C.

The instant invention also provides a composition that can offer an alternative to conventional greases and gels thereby also avoiding the environmental and manufacturing problems associated with conventional grease products. The inventive greases and gels can be tailored to range from microbial resistant to biodegradable; but in either case the greases/gels are non-toxic. By "non-toxic" it is meant satisfying the standards for toxicity set forth in ASTM E-729-88a. While the instant invention is compatible with a wide range of metals and metallic coatings, the instant invention can also obviate the usage of environmentally undesired metals, e.g., chrome, that are conventionally employed for imparting corrosion resistance. Similarly, while the instant invention can be employed with a solvent, in certain aspects the inventive grease/gel can be solvent free or substantially solvent free. By "substantially solvent free", it is meant that the grease/gel contains less than about 30 wt. %; and normally less than 10 wt. %, of volatile organic compounds (otherwise known as V.O.C.s). By "solvent free" it is mean that the grease/gel contains less than 5 wt. % and normally less than 1 wt. % of volatile organic compounds (V.O.C.s).

The inventive grease/gel can be employed as a substitute for conventional greases/gels; especially in environments where improved corrosion resistance is desired, e.g., wire rope and strand that is used in a wide range of applications including automotive and marine end-uses. Further, the inventive grease/gel can be employed for reducing, if not eliminating, corrosion under insulation (CUI). That is, corrosion upon metallic surfaces which are covered by an insulating covering or layer, e.g., a mechanically attached insulating sleeve upon a pipe. CUI is particularly problematic in the petroleum industry wherein corrosion can occur under refinery pipes, cracking columns, oil/gas pipelines, reaction vessels, among other areas. Corrosion under insulation can also occur in heating ventilation and cooling (HVAC) water lines, steam lines for chemical processing and power generation, conduits/piping on ships, among other areas. In addition, the inventive compositions can improve resistance to stress crack corrosion, among other benefits.

The instant invention can also offer an alternative to silicone containing lubricants. For example, in automotive painting environments silicone oils have been associated with adverse affects, e.g., on the quality of painted surfaces due to low molecular fractions of the silicone becoming air-borne under ambient conditions. The instant invention, however, can improve the corrosion resistance of silicon containing lubricants and gels.

The inventive grease/gel can also be employed upon chains, gears, pulleys, wire rope or strand for end-uses in automotive, industrial, marine cables, among other uses. The inventive grease/gel can be employed to protect pipe flanges. For example, a carbon steel pipe flange connected by carbon steel bolts can be protected by applying the inventive grease/gel upon and within the flange, and wrapping the flange with a tape, e.g., aluminum, fiber reinforced, typically with an adhesive. The flange wrap can be affixed by using any suitable fastening means such as metal bands, clamps, adhesives, among others.

The fluid or liquid portion of the inventive grease/gel can comprise a base oil comprising at least one member selected from the group consisting of mineral oil, synthetic oil, vegetable oil, fish oil, animal oil among any suitable fluid having lubricating properties. Examples of suitable base oils include at least one member from the group consisting of animal, vegetable, petroleum derived and synthetic oils such as polyalphaolefin (PAO), silicone oil, phosphate esters, fluorinated oils such as KRYTOX (supplied by the DuPont Company, Wilmington, Del.), mixtures thereof, e.g., a base oil comprising a mixture of vegetable and synthetic oils, among others. Typically, the base oil will comprise about 45 to about 90 wt. % of the grease e.g., about 70 wt. % to about 90 wt. %.

Environmentally preferred lubricants (EPL's) are preferred as base oils in applications where loss of material to the environment can occur. EPL's have the distinction of being biodegradable and/or essentially non-toxic. Biodegradable base oils include, but are not limited to fish oils, vegetable oils, lanolin, synthetic esters, low molecular weight polyalfaolefins, and polyalkylene glycols. Essentially non-toxic base oils include but are not limited to polyalfaolefins, polybutenes, vegetable oils and also lanolins. Examples of suitable vegetable base oils comprise at least one member from the group consisting of rapeseed oil, canola oil, soybean oil, corn oil, cottonseed oil, linseed oil, olive oil, tung oil, peanut oil, meadowfoam oil, sunflower oil, safflower oil, jojoba oil, palm oil, castor oil, among others. The vegetable base oil can be obtained from a genetically modified plant or be modified by water washing, refining, esterification, hydrolysis, etc.; thereby producing an oxidation resistant base oil e.g. high oleic soybean oil.

For applications requiring that the grease be exposed to a relatively high or low temperature, or wide variation in temperature during operation, synthetic fluids are typically employed, e.g., a diester oil based grease. If the grease comprises a metallic soap grease, then complexing agents can be employed for improving the so-called "dropping point" of the grease. Such agents are usually present in an amount from about 5 to about 25 wt. % of the grease.

A thickener is combined with a base oil to form a grease or gel. The thickener component of the grease can comprise any material that in combination with the selected base oil will produce a semi-fluid or solid structure. Examples of a suitable thickener comprise at least one member selected from the group consisting of soaps of aluminum, lithium, barium, sodium, calcium, mixtures thereof, and, in some cases, silicas and clays, mixtures thereof, among others. Characterization of grease as a function of the thickener is described in greater detail by J. George Wills in "Lubrication Fundamentals" (1980); hereby incorporated by reference. Thickeners of differing composition can be blended together, e.g., TEFLON fluoropolymers and polyethylene, provided they are compatible with one another and with the base oil. Additional ingredients can be combined with the thickener to impart special features or properties such as coupling agents dyes, pigments, anti-oxidants, among other components for tailoring the properties of the grease. Normally, the thickener will comprise about 5 to about 10 wt. % of the grease, and additional ingredients will comprise a total amount of about 5 to about 30 wt. %. However, when thermoplastic powders, for example, polytetrafluoroethylene, polyethlene and the like, are used as thickeners can be used effectively in amounts up to about 50% by weight.

The inventive grease can also comprise at least one anti-wear agent which may also function as a pour-point depressant, and/or an extreme pressure agent. Examples of suitable anti-wear agents comprise at least one member from the group consisting of tricresyl phosphate, dithiophosphates, fatty acid esters, metal stearates, zinc oxide, borax, boron nitride, ammonium molybdate, calcium carbonate, mixtures thereof, among others. In some cases, molybdenum disulfide, polyethylene, polytetrafluoroethylene, polyvinylidene fluoride/polyvinyl fluoride and dispersions thereof; mixtures thereof, among others, can be added to reduce friction and wear. Anti-wear agents can comprise about 0.1 to about 2 wt. % of the grease. Examples of extreme pressure agents can comprise at least one member selected from the group of graphite, triphenyl phosphorothionate, chlorinated parafins, dithiocarbonates, fatty oils, fatty acids, or fatty acid esters with a phosphite adduct; sulfurized fatty oils, fatty acids, or fatty acid esters; molybdenum disulfide, tungsten disulfide, phosphate esters, phosphorous-sulfur containing compounds, mixtures thereof, among others. Powdered extreme pressure agents can protect rough or uneven surfaces as well as tapered crevices when the agents are composed of a sufficiently wide particle size distribution and with an appropriate limit on the maximum particle size. The particle size distribution would normally allow the EP agent to fill in gaps and spaces upon the article to be protected (such as exist in wire rope, stranded cable, or armored cable). Extreme pressure agents can comprise about 2 to about 10 wt. % of the grease.

Surfactants, wetting agents, or surface active agents can optionally be included when desirable, such as pine oil and derivatives. Tall oil and derivatives, ethoxylates, acetylenic diols, silicones, silanes, sulfonates, fluorosurfactants, mixtures thereof, among others.

The inventive grease can further comprises at least one of silica and/or a silicate containing component for imparting corrosion resistance, e.g., a component containing —SiO— groups. The silicate containing component can interact with another component of the grease and/or a surface being protected. The interaction can provide a protective surface having enhanced corrosion resistance. The amount of silica/silicate containing material can range from about 1 to about 50 wt. % of the grease. The specific amount of silicate containing material is ascertained when considering the relative importance of corrosion resistance and lubrication for a particular application as well as the thickening ability of the silica or silicate.

In some cases, it is desirable to utilize a gel with less potential for oil to migrate out of or separate from the gel. Drying oils, e.g., linseed, or non-drying polymers can be added to the gel to reduce oil loss or migration from the gel. Polymers include but are not limited to polyurethane, silicone, acrylic, epoxy, oil modified polymers, and vegetable oils, e.g., an epoxidized vegetable oils. High solids polymers or substantially solvent free polymers are environmentally preferred, e.g., polymers containing less than about 30 wt. % V.O.Cs.

In other cases, it is desirable for the gel to form an outer self-supporting layer or skin. The portion of the gel underlying the self-supporting layer can remain in a substantially unchanged state, e.g., the retained physical characteristics of the underlying portion resemble those of an newly applied gel coating. If desired, the entire thickness of the grease/gel can be cured. The self-supporting layer can be achieved by including a UV activated catalyst. Examples of suitable catalyst are disclosed in WO 98/53008 and U.S. Pat. Nos. 4,892,894 and 4,308,118; the disclosure of which is hereby incorporated by reference. An added benefit of forming a self-supporting layer or so-called skin at the surface of the gel is that the layer provides improved resistance to rainwater and incidental contact. If desired the self-supporting layer can be painted by using conventional methods.

CROSS REFERENCE TO RELATED PATENTS AND PATENT APPLICATIONS

Figure 1:
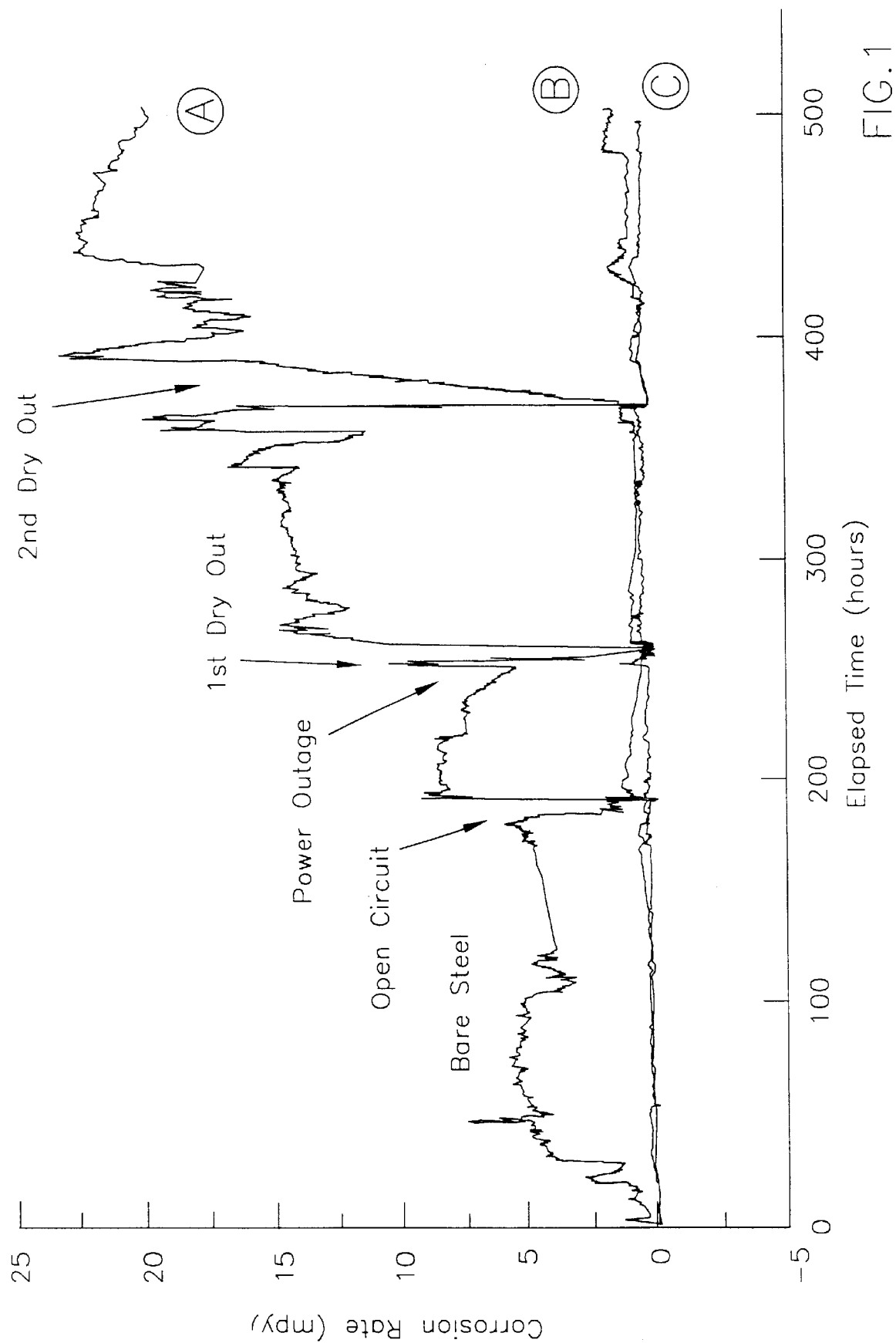
FIG. 1 is a graphical representation of steel corrosion when under insulation in terms of Time v. Corrosion Rate (mills per year-mpy).

The subject matter of the instant invention is related to copending and commonly assigned Non-Provisional U.S. patent application Ser. No. 09/016,853 (Attorney Docket No. EL001RH-8), filed on Jan. 30, 1998; Ser. Nos. 08/850,323 and 08/850,586 (EL001RH-6 and EL001RH-7 filed on May 2, 1997); Ser. No. 08/791,336 (Attorney Docket No. EL001RH-5 filed on Jan. 31, 1997) and 08/791,337 (Attorney Docket No. EL001RH-4 filed on Jan. 31, 1997) in the names of Robert L. Heimann et al., as a continuation in part of Ser. No. 08/634,215 (Attorney Docket No. EL001RH-3 filed on Apr. 18, 1996) in the names of Robert L. Heimann et al., and entitled "Corrosion Resistant Buffer System for Metal Products", which is a continuation in part of Non-Provisional U.S. patent application Ser. No. 08/476,271 (Attorney Docket No. EL001RH-2 filed on Jun. 7, 1995) in the names of Heimann et al., and corresponding to WIPO Patent Application Publication No. WO 96/12770, which in turn is a continuation in part of Non-Provisional U.S. patent application Ser. No. 08/327,438, now allowed (Attorney Docket No. EL001RH-1 filed on Oct. 21, 1994).

The subject matter of the instant invention is also related to copending and commonly assigned Non-Provisional U.S. patent application Ser. No. 09/016,849 (Attorney Docket No. EL004RH-1), filed on Jan. 30, 1998 and entitled "Corrosion Protective Coatings".

The disclosure of the previously identified patent applications and publications is hereby incorporated by reference.

DETAILED DESCRIPTION

A lubricating grease is defined by National Lubricating Grease Institute (NI.GI) as "a solid to semifluid product of dispersion of a thickening agent in a liquid lubricant. Additives imparting special properties may be included", e.g., refer to the Lubricating Grease Guide, 4th ed.; NLGI; Kansas City, Mo.; p.1.01; the disclosure of which is hereby incorporated by reference. For purposes of this invention, the terms grease and gel are used interchangeably wherein the term varies as a function of its application, e.g., dynamic greases or static gels. Typically, greases and gels fall broadly within the following formula:

| | |
|---|---|
| Base oil | 45–90% |
| Thickener | 5–25% |
| Additives | 1–30% |

In an aspect of the invention, the inventive composition can comprise a gel which forms a self-supporting outer layer or skin. This type of gel has the capability of forming an outer layer or skin for the purpose of providing improved characteristics such as a tack-free gel surface and resistance against washing away by rain or immersion. The outer skin can be achieved by any suitable means such as adding cross-linking polymers to the inventive composition. Examples of desirable methods for achieving cross-linking in the inventive composition include: 1) employing drying oils that exhibit an oxidative type curing mechanism, 2) by utilizing a moisture curing mechanism, 3) reactive cure, 4) catalytic or non-catalytic ultra-violet (UV) cure, 5) heat curing mechanism, among other chemistries. Examples of suitable UV curable catalyst (also known as photo-initiators) comprise acetophenoe, phosphene oxide, onium salts such as a sulfonium salt, mixtures thereof, among others. Depending upon the chemistry and environment, the selected method can be employed to obtain results that range from forming a self-supporting layer to hardening the entire inventive composition. The thickness of the self-supporting layer can be tailored by adding one or more UV absorbers, e.g., hydrogen abstraction or alpha cleavage, to the composition. Examples of UV absorbers comprise $TiO_2$, $ZnO$, among other pigments. Normally, the self-supporting layer is about 0.001 to about 0.05 inch thick depending on application.

A cross-linking polymer system can be added to any base oil so long as the polymer to be crosslinked is partially miscible in the base oil, the crosslinked layer or hardened composition is resistant to the base oil and the system is compatible with the remaining components of the inventive composition. Examples of suitable base oils include at least one member from the group of naphthenic and paraffinic mineral oils, and synthetic oils such as polyalfaolefins, silicones, phosphate esters, fluorinated oils, polybutenes, polyalkylene glycols, alkylated aromatics, among others. Conventional drying oils can also be used to form a self-supporting layer or skin, e.g., linseed oil, and the oxidative curing can be accelerated by metallic catalysis such as cobalt naphthenate. Polymers such as oil modified epoxies or polyurethanes may also be utilized, e.g., Ketimine type moisture curing epoxy resin. While the amount of cross-linking polymer can be tailored to obtain the desired affect, typically the polymer corresponds to about 0.010 to less than about 50 wt. % of the inventive composition, depending on compatibility between the polymer and the gel base oil. At loadings greater than 50% the composition becomes increasingly like the polymer itself and gel-like characteristics decrease.

In another aspect of the invention, the physical characteristics of the gel as applied are retained for an extended period, e.g., the gel is substantially non-crosslinked or lacking a self-supporting layer. In this aspect of the invention, the base oil of the grease/gel can comprise a polymer such as a polyurethane or an epoxy and an oil such as linseed or a drying oil. Without wishing to be bound by any theory or explanation, it is believed that employing a relatively large amount of oil inhibits crosslinking in the polymer thereby causing the gel to retain its as applied characteristics.

Moreover, the previously described polymer/drying oil combination can be employed as components in a non-toxic oil based gel, e.g., based upon polybutene, polyalphaolefin, lanolin, mixtures thereof, among others. The polymer component of the inventive composition serves to improve the composition's adhesion and/or cohesion to a metal surface. Without wishing to be bound by any theory or explanation, it is believed that the drying oil component, e.g., linseed oil, forms a reticulating or interpenetrating network among the oil and polymer components of the inventive composition. While this aspect of the invention can be employed in a wide of end-uses, this aspect of the invention is particularly useful in reducing pipe corrosion under insulation. If employed under pipe insulation, clean up or removal of the composition can be achieved by using commercially available citrus-based cleaners.

The pH of the grease can be tailored to be compatible with the metal surface which is contacted with the grease or gel.

That is, certain metals and alloys can become susceptible to caustic cracking when exposed to a relatively high pH, e.g, about 10 to about 14. In such cases, it may be appropriate to employ an alkali silicate such as sodium silicate with another silicate such as calcium silicate. Without wishing to be bound by any theory or explanation, the mechanism of protection follows the laws of chemical absorption and chemical affinity when the grease or gel contacts the surface being protected. The inventive grease will typically have a pH that ranges from about 7 to about 14. It is also believed that the presence of a relatively high pH in the grease can hydrolyze, for example, zinc borate and silica, and equipotentialize the surface being protected. Depending upon the composition of the grease or gel and surface being protected, one or more components of the grease or gel can react with each other and/or the underlying surface to form a protective layer or film, e.g., when the inventive grease or gel is applied to a zinc containing surface a unique surface comprising an alkali zinc silicate crystallites within an amorphous phase composition can form.

Normally, a silicate will be employed as a thickener as well as a corrosion inhibitor. The silicates used for preparing the inventive grease/gel that is employed in lubricating applications such as working wire ropes are normally finely ground by milling the raw material or the final composition, e.g., milled to a particle size of about 1 to about 20 microns and in some cases less than 200 mesh. Suitable silicates for working wire ropes among other applications can be selected from the group consisting of aluminum silicate, magnesium silicate, sodium silicate, calcium silicate, potassium silicate, lithium silicate, ammonium silicate, (each with various amounts of moisture of hydration and various ratios of silica to cations such as Na+, NH4, among others), mixtures thereof, among others, and can be mixed together by any suitable means. The aforementioned silicates can be combined with or, in some cases, replaced by molybdates, phosphates, zirconates, titanates, vanadates, permanganates, pertechnetate, chromate, tungstate, nitrate, carbonates, aluminates, ferrates, mixtures thereof among others. To this silicate mixture, can be added at least one of a surfactant, coupling agent and at least one dispersion oil that are compatible with the base oil of the grease, e.g., silicone oil PAO or polybutene, thereby forming an intermediate product. Typically, the coupling agent will comprise about 0.1 to about 2 wt. % of the grease and can be at least one member selected from the group consisting of organotitanates, organozirconates, organoaluminates and organophosphates. Surfactants include ethoxylates, pine oil, pine oil derivatives, tall oil, tall oil derivatives, acetylenic diols, long chain fatty acids, sulfosuccinates, alkyl sulfates, phosphates, sulfonates, long chain amines, quaternary ammonium compounds, organosilicons, fluorinated surfactants, mixtures thereof, among others. A suitable dispersion oil can be at least one member from the group consisting of linseed, boiled linseed, castor, canola, mineral, olive, peanut, sunflower, corn, soybean, cedar, pine, coconut, tung, vegetable, rapeseed, olive, jojoba, lanolin, meadow foam, cottonseed, sesame, palm, mixtures thereof, among others, and normally comprise about 1 to about 40 wt. % of the grease. In the case of lanolin, the amount of dispersion oil normally corresponds to about 5 to at least 10 wt. %.

The previously described intermediate product can be dispersed or mixed with the remaining components of the grease, e.g, base oil, extreme pressure additive, among others. By adding the intermediate product to the remaining components, a corrosion resistant grease is obtained.

The aforementioned inventive intermediate product can be introduced into any suitable type of grease or gel such as:

1) Soap-Thickened Greases/Gels
   Aluminum Soap Grease
   Hydrated Calcium Soap Grease
   Anhydrous Calcium Soap Grease
   Sodium Soap Grease
   Lithium Soap Grease
2) Soap-Complexed Greases/Gels
   Aluminum Complexed Grease
   Calcium Complexed Grease [the amount of alkaline silicates that can be added to calcium complexed grease is relatively low in comparison to other greases]
   Barium Complexed Grease
   Lithium Complexed Grease
3) Non-Soap Greases/Gels
   Mineral Oil Based Grease
   Vegetable Oil Based Grease
   Organo-Clay Grease
   Polyurea Grease
   Polyurea Complexed Grease The thickener utilized in the soap-based greases is typically a saponification reaction product that is generated during the grease-making process. The saponification reaction can occur among at least one of the following components long-chained fatty acids, e.g. stearic acid, oleic acid, among others; fat, e.g., beef tallow; and an alkali component, e.g., aluminum, calcium, sodium, lithium hydroxide, among others. The aforementioned alkali component is normally used in a slight excess to facilitate driving the saponification reaction and to neutralize any remaining free acid. As the saponified product is cooled, the product can form a fibrous network through the base oil, e.g., a mineral or hydrogenated castor oil, thereby thickening the grease. For best results, the fatty acid or fat component is compatible with the base oil, the appropriate amount of thickener is employed, and the saponification reaction occurs at relatively dispersed locations within the base oil. For example, the aforementioned fibrous network may not be adequate if the saponification is conducted separately and then mixed into the base oil. Finally, the rate of cooling and amount of water present can impact the fibrous network formation rate.

A soap complexed grease is similar to the soap-thickened grease in that both types of greases rely upon the saponification reaction. However, the soap complexed greases have an additional reactant which becomes a component of the saponified product and facilitates forming the fibrous networks. The complexing or chelating reactant is normally a metal salt of a short chained organic acid, e.g., a calcium acetate, or a metal salt of an inorganic acid, e.g., lithium chloride. (The grease may also contain aluminum atom(s) which were part of the organic soap molecules, e.g. aluminum distearate and aluminum hydroxide) Total thickener contents, respectively, of the calcium, aluminum, and lithium complex greases are about 25 to about 35 wt. %, about 5 to about 9 wt. %, and about 12 to about 18 wt. %. In one aspect of the invention, the thickening soap may comprise sulphurized-phosphorized lard oil in lithium grease. This thickening soap can also function as an extreme pressure additive within the grease.

Non-soap based greases do not require the previously described saponification reaction to thicken the grease. Non-soap greases employ physical additives for thickening. While any suitable thickener can be employed, an example of a suitable thickener is organo-clay particles, or platelets of small organic or inorganic particles dispersed within the base oil. Further examples of thickeners comprise at least one of bentonite clay, fumed silica (aerogel), carbon black, powdered plastics, gilsonite, mixtures thereof, among others. In addition, surface modified thickeners may also be utilized. Normally, the thickener has a large surface area and typically a certain amount of an oil absorption capability.

Polyurea and polyurea complexed greases are related to the soap based greases in that reactions polymerize component materials, e.g., isocyanates and amines, to form the thickener, e.g., polyurea. However, the polyurea normally does not form fibrous networks to the extent of soap based greases. The complexed polyureas utilized the same types of complexing agents as the complexed soap based greases.

The following types of additives may be incorporated into greases or gels to achieve a variety of desired properties: rust inhibitors, antioxidants, soaps, odor modifiers, tackiness agents, structure modifiers, metal deactivators or corrosion inhibition for non-ferrous metals, solid lubricants (such as graphite, zinc oxide, borax, among other conventional solid lubricants), phosphate esters, polytetrafluoroethylene, dithiophosphates, dithiocarbonates, antimicrobial agents, mixtures thereof, among other suitable additives. Examples of suitable rust inhibitors comprise at least one member selected from the group consisting of fatty acids, sulfonates, amines or amine phosphates, amides of fatty acids, succinates, benzotrizoles, tolutriazoles, mercaptobenzothiazole, thiadiazoles, metal carboxylates, mixtures thereof, among others. Examples of suitable antioxidants comprise at least one member selected from the group consisting of aromatic amines, hindered phenols, diphenylamine, phenyl alpha-naphthylamine, 2,6-di-t-butylphenol, phenothiazine, alkylated diphenylamines, alkylated phenyl alpha-naphthylamines, 2,6-di-t-butyl-p-cresol (BHT), polymeric BHT, peroxide decomposers, vitamin C (ascorbic acid), vitamin E (alpha tocopherol) and derivatives thereof such as sodium ascorbate, alpha tocopherol acetate); mixtures thereof, among others to inhibit natural or high temperature oxidation of the composition. The formulation can also include additives to improve ultraviolet (UV) light stability such as Tinuvin (Ciba Geigy), a substituted hydroxyphenyl benzotriazole. Examples of soaps include lithium stearate, aluminum stearate, calcium stearate, or zinc stearate. Soaps may be utilized to impart added lubricity, heat resistance, or moisture resistance. Examples of suitable tackiness agents comprise at least one member selected from the group consisting of high molecular weight hydrocarbons, rubber latex, polybutenes, estergums and terpene resins mixtures thereof, among others. Examples of suitable structure modifiers comprise at least one member selected from the group consisting of glycerol, alcohols, glycols, fatty acids, water, alkali sufonaphthenates, mixtures thereof, among others. Examples of suitable anti-microbial agents comprise at least one member selected from the group consisting of d'limonine, zinc borate, silver, quaternary ammonium compounds, mixtures thereof, among others. Other environmentally less desirable anti-microbial compounds include compounds of mercury, tin, antimony, and mixtures thereof. The additives can also comprise at least one member selected from the group consisting of surfactants, wetting agents, surface active agents, pine oil, derivatives, tall oil and derivatives, ethoxylates, acetylenic diols, silicones, silanes, fatty oils or acids with a phosphate adduct, sulfurized fatty oils, molybdenum disulfide, tungsten disulfide, mixtures thereof, among others. The total amount of these additives normally does not accumulate to more than about 5 wt. % of the total grease formulation. The inventive composition can also include a substance for imparting conductivity to the composition such as graphite carbon, conductive polymers, metal powder or flake mixtures thereof, among others. The amount of conductive component normally ranges from about 15 to about 45 wt. % of the inventive composition.

While the inventive grease/gel can provide a physical barrier from a corrosive environment, the grease can also supply a silica/silicate product that imparts the previously described corrosion-inhibiting properties. Depending upon the composition of the metal surface, composition of grease/gel applied to the surface, temperature and length of time the composition is in contact with the metal surface, surface pH, at least a portion of the grease can interact with the metal surface. The interaction can produce a mineral-like surface coating, e.g, less than about 100 Angstroms thick, characterized by unique crystallites, e.g, an alkali zinc silicate, within an amorphous matrix. A more detailed description of mineral layers and precursors thereof can be found in the aforementioned copending and commonly assigned U.S. Patent Applications; the disclosure of which was incorporated by reference.

While the inventive grease can be employed in connection with a virtually unlimited array of surfaces, desirable results have been obtained when the grease is employed upon a zinc containing surface or alloy. The inventive grease can be employed in a virtually unlimited array of applications such as upon pipe in order to inhibit corrosion under insulation, wipe rope and strand products during manufacture or afterwards by injecting the grease, and applied to the exterior armor/sheathing of electrical and optical fiber cables that are exposed to marine environments as well as mechanical force cables such as those employed in automobiles, boats and aircraft. The invention is also useful in cable applications where RFI-EMI properties are important such as some undersea cables. The inventive grease can also be employed as cutting/buffing/grinding fluids for ceramics/metals, protect and lubricate lead alloy battery terminals, protect and lubricate lock assemblies, and protect coiled metal rolls or stack metal sheet from corrosion, among many other applications where corrosion resistance and/or lubrication are useful. The inventive greases or gels can be employed in single or multiple layers having chemically similar or distinct chemical compositions e.g., employing one composition as a pre-coat or primer for another composition. The inventive greases or gels can also be protected by any suitable outer covering such as a mastic tape or wrap, fiberglass batting, lagging, films (e.g., Mylar®, aluminum, etc.), among others. The outer covering can impart improved resistance to impact, UV radiation, water erosion, among other chemical or physical agents.

The inventive greases or gels can be applied to the above users via spray, trowel, glove, brush, immersion, pressure injection, or pumping. Normally, for spraying the grease/gel is combined with a diluent such as at least one solvent selected from the group consisting of isopropanol, reagent alcohol, naphta, dimethyl ether, methyl ketone, mineral spirits, e.g., about 10 to about 20 wt. % diluent and normally about 12 to about 14 wt. %, among other commercial solvents such as that supplied as Ensolve®. Different combinations of diluents can be used for tailoring smoothness, sag of material, bubbles, sponginess, among other properties. If desired, before applying the inventive grease/gel upon a surface the surface can be pretreated, e.g., by applying a coating comprising at least one of PAO or polybutene oil. After being applied upon a surface (with or without a pretreatment), at least a portion of the applied inventive greases/gels can be modified for improving moisture resistance as well as impart other improved properties. An example of a modification method comprises heating the applied grease/gel to form an exterior skin or layer.

The inventive greases or gels can also be applied via an aerosol spray. The inventive greases or gels are combined with the aforementioned diluents and a suitable propellant. Examples of suitable propellants comprise one or more of fluorocarbons such as HFC-134, IIFC-134a, IIFC-152a, among others; hydrocarbons such as alcohol, butane, isobutane, polybutene, propane, isopropane, dimethylether and isomers thereof; commercially available propellants such as A-31, A-46, among others; carbon dioxide, mixtures thereof, among others. The ratio of grease or gel to propellant is normally about 1:1; but the ratio can vary widely to achieve a desired viscosity or application depth. The dispensing characteristics.

The following Examples are provided to illustrate not limit the scope of the invention as defined in the appended claims. The weight percent ranges in certain examples are present to due variations in mixing conditions, retention in mixing apparatus, among other conventional manufacturing variations.

EXAMPLE 1

The formulation listed below in Table 1 was produced by adding powdered materials to the PAO base oil, i.e., polymerized 1-decane. The PAO oil was poured into a 1 quart stainless steel bowl. The powdered materials were then added to the PAO and mixed by hand.

TABLE 1

| COMPONENT | SUPPLIER | AMOUNT % BY WT. |
|---|---|---|
| PAO base oil | Nye Lubricants | 53.5% |
| Silica | Nye Lubricants | 9.8 |
| G Sodium silicate | PQ Corp. | 30.0 |
| Zinc Borate | U.S. Borax | 5.0 |
| p-Hydroxy Aniline | Mallinckrodt Chemical | 0.7 |
| Indigo Blue Dye | Tricon Colors Inc. | 1.0 |

This composition, when applied to a standard ACi electrogalvanized steel test panel (E60 EZG 60G 2 side 03×06× 030) to a thickness of 1/16 inch, protects from red corrosion for a minimum of 1000 hours in accordance with ASTM B117 salt spray exposure. When the composition was removed from the panel after a minimum of 24 hours by carefully scraping off the excess and then washing with naphtha, an average of 192 hours of ASTM B117 salt spray exposure was obtained prior to the appearance of red corrosion products compared to 120 hours for untreated control samples.

Depending upon the surrounding environment, improved corrosion resistance can be obtained by omitting p-Hydroxy Aniline. Further, the corrosion resistance of a PAO based grease or gel can be improved by the adding at least one of sodium molybdate, sodium carbonate, and sodium silicate.

EXAMPLE 2

A second formulation substantially the same as that described in Example 1 was prepared with the exception that p-Hydroxy Aniline was omitted. The removal of the p-Hydroxy aniline improved the environmental acceptability of the formulation without adversely impacting the corrosion resistant properties of the grease.

A third formulation was prepared by omitting the zinc borate. While silica was employed as a thickener, e.g., refer to the Standard Base Formulation in Table 2 below, the presence of silica and a silicate can have a desirable combined effect upon the corrosion resistant properties of the grease. Zinc borate functions as a fire retardant and a microbiological inhibitor and, therefore, can be removed with its attendant properties.

EXAMPLE 3

The following formulas were produced to compare the corrosion resistance of the inventive greases to a base formulation.

TABLE 2

| COMPONENT | SUPPLIER | AMOUNT (WT %) |
|---|---|---|
| BASE FORMULATION | | |
| PAO | Durasyn 174 (Amoco Oil Co.) | 88.4% |
| silica | Cabosil TS720 (Cabot Corp.) | 11.1% |
| dye | T-17N Dye (DayGlo Color Corp) | 0.5% |
| CORROSION RESISTANT FORMULATION 1 | | |
| PAO | Durasyn 174 (Amoco Oil Co.) | 57.3% |
| PAO | Durasyn 166 (Amoco Oil Co.) | 14.3% |
| silica | Cabosil TS720 (Cabot Corp.) | 7.3% |
| zinc borate | Borogard ZB (U.S. Borax) | 4.1% |
| sodium silicate | G Grade (PQ Corp.) | 16.3% |
| indigo blue dye | Tricon Color Corp. | 0.7% |
| LUBRICANT FORMULATION 1 | | |
| PAO | Durasyn 174 (Amoco Oil Co.) | 58.4% |
| polytetrafluoroethylene | Fluro 300 (Micro Powders Inc.) | 40.9% |
| indigo blue dye | Tricon Color Corp. | 0.1% |
| organo zirconate | Ken-React NZ-12 Kenrich Petrochemical, Inc. | 0.6% |
| CORROSION RESISTANT FORMULATION 2 | | |
| silicone oil | Dow Corning 200 | 75% |
| silica | Cabosil TS729 (Cabot Corp.) | 15% |
| sodium silicate | G grade (PQ Corporation) | 10% |

Corrosion Formulation 1 was prepared by mixing the zinc borate and sodium silicate together in a manner described in Example 1. The borate/silicate blend was added to Durasyn 166 PAO. The silica was mixed with Durasyn 174 PAO. The two PAO mixtures were then combined. The dye was then added to the combined PAO mixtures.

Lubricative Formulation 1 was prepared by first treating the Fluoro 300 with a 2.3 weight % solution of NZ-12 in 2-propanol, and allowing the 2-propanol to evaporate. The treated Fluoro 300 was then mixed into the Durasyn 174 by hand. After thorough mixing, the Indigo blue dye as introduced. While both Formulations have a wide range of uses, Lubricative Formulation 1 is particularly useful as an emergency or a parking brake cable lubricant.

Corrosion Formulation 2 was formed substantially in the same manner as Corrosion Resistant Formulation 1. If desired, the sodium silicate of the previously identified Formulations can be mixed with or substituted for calcium silicate, trisodium phosphate, sodium bicarbonate, among others, in order to obtain a grease/gel with a lower pH. Further, if desired the sodium silicate can be at least partially replaced by polytetrafluoroethylene to improve its lubricative properties.

EXAMPLE 4 corrosion Resistant Formulation No. 1 was coated upon a standard ACT electrogalvanized steel test panel (1:60 EZG 60G 2 side 03×06×030) by applying an excess and smoothing with a gate type applicator to leave a 1/16 inch thick layer. The grease/gel remained in contact with the test panel for a period of about 24 hours. The grease/gel was removed from one-half of the test panel by light scrapping and washing with naphtha.

The test panels were then tested under a salt spray environment in accordance with the ASTM Procedure B117. The area where the coating had been removed lasted about 216 hours before 5% of the surface area was covered with red rust. The grease/gel coated area of the test panel had no visible red rust after 1,000 hours of salt spray exposure.

EXAMPLE 5

The following formula was prepared and applied to an outdoor above ground piping which was subsequently covered with an external layer of insulation.

| COMPONENT | SUPPLIER | AMOUNT |
|---|---|---|
| Polyalfaolefin Base Oil | Durasyn 174/Amoco Oil Co. | 81.7 wt. % |
| Silica | Cabosil TS-720/Cabot Corp. | 4.7% |
| Synthetic Calcium Silicate | Hubersorb 600/J. M. Huber Corp. | 11.7% |
| Polybutene Based Tackifier | IdaTac M256/Ideas, Inc. | 1.5% |
| Dye | Indigo/Tricon Color Corp. | 0.4% |

The Hubersorb 600 and Cabosil TS-720 were dry mixed together in a covered 5 gallon pail for 5 minutes and then the mixed composition was added to the Durasyn 174 base oil in successive additions until all the powder had been added. The resulting mixture was then mixed for an additional 20 minutes.

After combining the Durasyn, IdaTac M256 was added volumetrically from a syringe and mixing was continued for 15 minutes. Finally, the Indigo dye was added and the composition was mixed for an 15 additional minutes.

The final composition had a penetration number of 317 as determined in accordance with ASTM-D217. The resulting composition was applied to a standard cold roll steel panel in a clean/unpolished condition to obtain a film thickness of 1/16 inch. After 24 hours of exposure to salt spray in accordance with ASTM B-117 no corrosion had occurred beneath the film.

The composition was also applied to a rusted 2.5 inch diameter steel pipe that had been wire brushed to remove loose scale. The film was applied to approximately 1/16 thickness and the pipe was not covered with insulation. After 4 weeks of outdoor exposure (including rain and wind events) no noticeable degradation, or less of coated material from the pipe was observed.

EXAMPLE 6

The above formulation for CUI application is adapted for use on an automotive/industrial battery terminal to control the corrosion of battery posts. A battery terminal corrosion protectant is prepared by removing the indigo dye and adding up to about 30% by weight conductive carbon black to the aforementioned composition, (the conductive material will provide a dark color).

EXAMPLE 7

Amounts of Cabosil TS-720, Hubersorb 600, Lithium Hydroxystearate, S-395-N5 and Ackrochem 626 were measured out in quantities sufficient to prepare a 350 g. total batch. These powders were then dry mixed and then added to the Lubsnap 2400 oil which had been preheated to 110° C. The composition was then mixed with a Premier Mill Series 2000 Model 84 Laboratory Dispersator at N3000 rpm utilizing a 2-inch ZNOCO Desron dispersion blade for 15 minutes. At this time the Lubrizol 3108 and Tallicin 3400 was added and mixed for another 15 minutes. A composition containing the following components was prepared in accordance with Example 1, and used to protect wire rope and stranded cables:

| COMPONENT | SUPPLIER | AMOUNT |
|---|---|---|
| Napthenic Mineral Base Oil | Lubsnap 2400/Tulco Oils Inc. | 67.5% |
| Silica | Cabosil TS-720/Cabot Corp. | 6.3% |
| Synthetic Calcium Silicate | Hubersorb 600/J. M. Huber Corp. | 16.2% |
| Lithium Hydroxystearate | Witco Corp. | 2.5% |
| Polyisobutylene | Indopol H-100/Amoco | 2.5% |
| Wetting Agent** | Additive 3108/Lubrizol Corp. Tallicin 3400/Pflaumer Brothers, Inc. | 2.5% |
| Micronized Polyethylene | S-395-N5/Shamrock Inc. | 2% |
| Blue Dye | Ackrochem 626/Ackron Chemical Co. | 0.5% |

**Tallicin 3400 is sold commercially as being a proprietary composition. Examples of other suitable wetting agents comprise at least one member selected from the group consisting of pine oils, tall oil, pine oil derivatives, tall oil derivatives, mixtures thereof, among others.

EXAMPLE 8

The following formula was prepared in accordance with Example 1, and applied to a steel panel to form an outer self-supporting layer that was subsequently covered with an external layer of wollastonite insulation:

| COMPONENT | SUPPLIER | AMOUNT |
|---|---|---|
| Polyalfaolefin Base Oil | Durasyn 174/Amoco Oil Co. | 51.6% |
| Linseed Oil | commercial | 30.0% |
| Cobalt Naphthenate | commercial | 0.1% |
| Silica | Cabosil TS-720/Cabot Corp. | 4.7% |
| Synthetic Calcium Silicate | Hubersorb 600/J. M. Huber Corp. | 11.7% |
| Polybutene Based Tackifier | IdaTac M256/Ideas, Inc. | 1.5% |
| Dye | Indigo/Tricon Color Corp. | 0.4% |

EXAMPLE 9

The benefit of adding polymer to an inventive composition was demonstrated by adding a polymer gel to a base gel formula that was prepared in accordance with Example 1 and has the following formula:

| COMPONENT | BASE GEL SUPPLIER | AMOUNT |
|---|---|---|
| Polyalfaolefin Oil | Durasyn 174 (Amoco) | 55.2 wt. % |
| Fumed Silica | Cabosil TS-720 (Cabot Corp.) | 9.8 wt. % |
| Sodium Silicate | G Grade (PQ Corp.) | 30 wt. % |
| Zinc Borate | Borogaro ZB (U.S. Borax) | 5 wt. % |

POLYMER GEL

Polyurethane polymer was added to the gel by mixing ACE 0.16381 Polyurethane Clear Finish (supplied by Westlakes) with the aformentioned base gel in a 1:15 ratio by weight respectively. The gel and polymer compositions were mixed with a spatula for approximately 15 minutes to form a homogeneous mixture. Standard 0.032 in.×3 in.×6 in. cold roll steel panels (supplied by ACT) were coated with a 0.05 inch thick layer over a 4 inch by 3 inch area. One panel was coated with the Base Gel Formula and one panel was coated with the Polymer Gel containing Formula.

In order to illustrate the effectiveness of the polymer gel formula to protect metal surfaces from corrosion under insulation, a piece of wollastonite mineral pipe insulation (approximately 0.25 inches×1.5 inches×5 inches) was placed on each gel coated panel with the broad surface contacting the gel. A 71 gram weight was placed on top of each piece of insulation and the panels were allowed to sit at ambient conditions for 48 hours. At 48 hours, the weight and insulation was removed and the following observations and measurements were made.

| (g) GEL TYPE | INITIAL WEIGHT (g) OF INSULATION | FINAL WEIGHT (g) OF INSULATION | OIL ABSORPTION INTO INSULATION |
|---|---|---|---|
| Base Gel | 8.085 | 9.4412 | 1.356 g. |
| Polymer Gel | 7.562 | 7.673 | 0.111 g. |

The layer of Base Gel beneath the insulation was visibly observed to have cracks or separations in the gel due to oil loss from the gel, e.g., the oil was absorbed by the adjoining insulation. In contrast, no cracks were noted in the polymer containing gel composition. As illustrated above, the polymer gel reduced oil loss or migration into the insulation to less than one tenth of the loss that the Base Gel exhibited.

This Example was repeated by replacing the polyurethane polymer with epoxy resins supplied by Reichhold Chemical as EPOTUF 690 and 692. The amount of epoxy was 20 wt. % of the total composition.

EXAMPLE 10

A substantially biodegradable formulation having the following formulation was prepared:

| COMPONENT | SUPPLIER | AMOUNT |
|---|---|---|
| Polyol Ester | Emkarate 1950/ICI Chemicals | 67.5 wt. % |
| Fumed Silica | TS-720/Cabot Corp. | 5.4 wt. % |
| Calcium silicate | Hubersorb H-600/J. M. Huber Corp. | 3.6 wt. % |
| Lithium Stearate | Witco Corporation | 14.3 wt. % |
| polyethylene | S-395-N5/Shamrock Technologies | 3.6 wt. % |
| polybutene | Indopol II-300/Amoco Chemical | 3.6 wt. % |
| hydrated lime | Mississippi Lime Co. | 2.0 wt. % |

A 350 gram batch of the above composition was prepared by heating the Emkarate 1950 base oil to a temperature of 110° C., and then mixing in the pre-mixed powdered components of the grease in a Premier Mill Series 2000 Model 84 Laboratory Dispersator at N3000 rpm utilizing a 2 inch INDCO Design D dispersion blade for 15 minutes. Finally, the Indopol H-300 polybutene was added and the composition was mixed for another 15 minutes. After allowing the composition to cool to room temperature, the penetration in accordance with ASTM-D217 was measured and determined to be 277.

Three standard 0.032 in.×3 in.×6 in. cold roll steel panels (ACT Laboratories) were rinsed with Naphtha and wiped with a Kimwipe prior to applying 2.25 grams to the entire front panel surface (N 0.008 in. thick) with a Micrometer gate applicator. The coated panels were exposed to salt spray conditions (20% aqueous sodium chloride solution) as established in MIL-G-18458B for 10 days. After 10 days, the grease was wiped off and the panels were inspected for red corrosion farther than 0.25 inches from the edges of the panel. Each panel had less than 7 corrosion spots which exceeded 1 mm in diameter, and surface coverage by corrosion did not exceed 5%.

EXAMPLE 11

The following Example demonstrates that certain naturally occurring base oils are combinable with synthetic base oils. This Example also illustrates formation of a coating/film having a relatively firm or self-supporting outer surface and uncured material underlying the outer surface. The following compositions were prepared by in accordance with Example 7.

| AMOUNT | COMPONENT | SUPPLIER |
|---|---|---|
| COMPOSITION A | | |
| 55–60/28–30 wt. % 2:1 ratio | Linseed oil/PAO | ADM/Amoco |
| 0.75–1.0 wt. % | calcium silicate-Hubersorb 600 | J. M. Huber Corp |
| 2.0 wt. % | amber wax-Bareco Ultraflex | Bareco-Petrolite |
| 6–8 wt. % | fumed silica-Cabosil 610 | Cabot Corp. |
| COMPOSITION B | | |
| 55–60/28–30 wt. % 2:1 ratio | Linseed oil/PAO | ADM/Amoco |
| 0.75–1.0 wt. % | calcium silicate-Hubersorb 600 | J. M. Huber Corp |
| 5.0 wt. % | amber wax-Bareco Ultraflex | Bareco-Petrolite |
| 6–8 wt. % | fumed silica-Cabosil 610 | Cabot Corp. |

These compositions were applied by using a drawndown gate onto an ACT steel test panel. The composition formed a coating/film in about 24 hours by drying under ambient conditions. The characteristics of the coating/film were an outer self-supporting and resilient layer. The portion of the coating/film between the outer layer and test panel remained uncured in a substantially uncharged physical state. When applied to the test panel the coating/film imparted enhanced corrosion resistance to panel, in that the outer layer is water resistant and repellent while the underlying uncured portion inhibits the ability for corrosive materials to attack the panel.

The corrosion resistance of the coating/film was demonstrated in accordance with ASTM Test No. B-117 (salt spray) and D22147 (humidity). Test panels coated, respectively, with compositions A and B were tested together at 500 hrs., 750 hrs., and 1000 as per ASTM B-117. The outer self-supporting layer remained intact, was not penetrated by corrosion material, and remained flexible. The portion of the coating/film under the outer layer remained gel-like after 1,000 hrs. of salt exposure. No rust was observed via visual detection after 1,000 hours of ASTM B-117 testing.

Test panels coated, respectively, with Compositions A and B were tested at 1000 hrs as per ASTM D2247. Results similar to the previous ASTM B-117 were obtained; except that the outer layer was more flexible. No rust was observed via visual detection after 1,000 hours of ASTM D2247 testing.

In addition to the corrosion resistance, panels coated with Composition B were evaluated for temperature and pressure resistance. In test two panels were coated with Composition B, allowed to cure for 48 hrs. under ambient conditions and placed into an All American brand Model No. 25X pressure sterilizer, manufactured by Wisconsin Aluminum Foundry Co., at 240F and 2X atmospheric pressure for a period of 24 hrs. The only visually detectable affect was an increased darkening of the outer self-supporting layer. The temperature and pressure resistance of a panel coated with Composition B that had undergone 750 hrs. in the ASTM B117 Salt Spray was also evaluated. Similar to the aforementioned results, the only reportable change was a darkening of the outer self-supporting layer.

EXAMPLE 12

This Example illustrates a composition, which includes synthetic and naturally occuring oils, that forms a self-supporting layer. The following composition was prepared by Example 7:

| COMPONENT | SUPPLIER | AMOUNT |
|---|---|---|
| Linseed oil | ADM | 50–60 wt. % |
| polybutene | Indopol H-50/Ideas Inc. | 20–30 wt. % |
| calcium silicate | Hubersorb 600/Huber Corp. | 2–8 wt. % |
| wax | Ultraflex Amber Wax (Bareco Petrolite) | 0–4 wt. % |
| fumed silica | TS610 or TS720 (Cabot Corp.) | 5–8 wt. % |
| polyethelene | S-395-N5 (Shamrock Tech.) | 0–4 wt. % |

The viscosity and tackiness properties of the above composition can be improved by adding about 1–4 wt. % lithium stearate, e.g., such as that supplied by Reagens of Canada. The lithium stearate can be added to the composition by being introduced and admixed along with the other components of the composition.

EXAMPLE 13

This Example illustrates a non-migrating composition that can be employed to reduce, if not eliminate, corrosion under insulation and can be applied to a wet surface. The following composition was prepared by Example 7:

| COMPONENT | SUPPLIER | AMOUNT |
|---|---|---|
| Polybutene | Indopol H-50 - Ideas Inc. | 54–64 wt. % |
| Epoxy Resin | EP08YF 692 - Reichhold Chemical | 15–25 wt. % |
| Fumed Silica (Cab-o-sil) | TS720 - Cabot Corp. | 3–8 wt. % |
| Calcium Silicate | Hubersorb 600 - Huber Corp. | 4–10 wt. % |
| Lithium Stearate | Reagens - Reagen Co. Canada | 4–10 wt. % |

The above composition was applied to a wet metallic substrate (test panel) without adversely impacting the adhesion to the substrate. The composition was also applied to a metallic substrate while the substrate was immersed in water. The characteristics of the composition can be tailored by incorporating heat-bodied linseed oil, e.g., about 5 to about 10 wt. % of OKO-S70 supplied by ADM Corp. If desired, about 5 to about 10 wt. % silicone resin could also be incorporated into the composition, e.g., the silicone supplied by GE (General Electric) of Waterford N.Y.

EXAMPLE 14

The following Example demonstrates formation of the previously described mineral layer as a result of a component of the grease/gel interacting with the surface of galvanize metal substrates. The interaction was detected by using ESCA analysis in accordance with conventional methods.

Analytical conditions for ESCA:

| | |
|---|---|
| Instrument | Physical Electronics Model 5701 LSci |
| X-ray source | Monochromatic aluminum |
| Source power | 350 watts |
| Analysis region | 2 mm × 0.8 mm |
| Exit angle* | 50° |
| Electron acceptance angle | ±7° |
| Charge neutralization | electron flood gun |
| Charge correction | C-(C,H) in C is spectra at 284.6 eV |

*Exit angle is defined as the angle between the sample plane and the electron analyzer lens.

Coating were made up based on the ingredients and formulation methods shown in Example 10. Different base oils and base oil combinations, alkali silicate types, silicate amounts, and substrates were used to represent a cross section of possible ranges. The different base oils comprised polyalphaolefin (polymerized 1-decene) and linseed oil. Two types of alkali silicates were also used, sodium and calcium silicate. The concentration of the alkali silicate was also varied from 1% to 50% wt to show the range of possible concentrations. Each set of coatings were applied onto both cold rolled and galvanized steel panels.

Each formulation was mixed together and applied onto the given substrate at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPA analysis | | | | | | | | |
|---|---|---|---|---|---|---|---|---|
| Sample # | 1 | 2 | 3 | 4 | 5 | 6 | 7 | 8 |
| Durasyn 174 wt. % (PAO) | 49.3 | 44.3 | 49.3 | 44.3 | 87 | 79.2 | 70.4 | 44 |
| Linseed Oil wt. % | 49 | 44 | 49 | 44 | 0 | 0 | 0 | 0 |
| Fumed Silica wt. % | 0.7 | 0.7 | 0.7 | 0.7 | 12 | 10.8 | 9.6 | 6 |
| Sodium silicate wt. % | 1 | 10 | 0 | 0 | 0 | 0 | 20 | 50 |
| Calcium silicate wt. % | 0 | 0 | 1 | 10 | 1 | 10 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2 p) binding energy (BE) in the low 102 eV range, typically between 102.1 to 102.3. The silica can be seen by Si(2 p) BE between 103.3 to 103.6 eV. Higher binding energies (>103.8 eV) indicate precipitated silica due to the charging effect of the silica which has no chemical affinity to the surface. The resulting spectra show overlapping peaks, upon deconvolution reveal binding energies in the ranges representative of metal silicate and silica.

EXAMPLE 15

The following Example demonstrates formation of the previously described mineral layer as a result of a component of the grease/gel interacting with the surface of lead substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto lead coupons. Prior to gel application, the lead coupons cut from lead sheets (McMasters-Carr) were cleaned of its oxide and other dirt by first rubbing with a steel wood pad. The residue was rinsed away with reagent alcohol and Kim wipes.

Each formulation was mixed together and applied onto a lead coupon at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

Formulations used for ESCA/XPS analysis on lead panels

| Sample # | 1 | 2 | 3 | 4 |
| --- | --- | --- | --- | --- |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2 p) binding energy (BE) in the low 102 eV range, typically between 102.1 to 102.3. The silica can be seen by Si(2 p) BE between 103.3 to 103.6 eV. The resulting spectra show some overlapping peaks, upon deconvolution reveal binding energies in the ranges representative of metal silicate and silica. The primary binding energy for all of these samples were in the range of 102.1 to 102.3 eV.

EXAMPLE 16

The following Example demonstrates formation of the previously described mineral layer as a result of a component of the grease/gel interacting with the surface of GALFAN® substrates (a commercially available alloy comprising zinc and aluminum). The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto galfan coated steel coupons. Prior to gel application, the galfan coupon, cut from galfan sheets (GF90, Weirton Steel), were rinsed with reagent alcohol.

Each formulation was mixed together and applied onto a GALFAN® coupon at a thickness between 5 to 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

Formulations used for ESCA/XPS analysis on Galfan ® panels

| Sample # | 1 | 2 | 3 | 4 |
| --- | --- | --- | --- | --- |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates, ESCA detection of the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2 p) binding energy (BE) in the low 102 eV range, typically between 102.1 to 102.3. The silica can be seen by Si(2 p) BE between 103.3 to 103.6 eV. The resulting spectra show some overlapping peaks, upon deconvolution reveal binding energies in the ranges representative of metal silicate and silica.

EXAMPLE 17

The following Example demonstrates formation of the previously described mineral layer as a result of a component of the grease/gel interacting with the surface of copper substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto copper coupons. Prior to gel application, the copper coupons cut from copper sheets (C110, Fullerton Metals) were rinsed with reagent alcohol.

Each formulation was mixed together and applied onto a copper coupon at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on copper | | | | |
|---|---|---|---|---|
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates, ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 and 102.3. The silica can be seen by Si(2p) BE between 103.3 to 103.6 eV. The resulting spectra show some overlapping peaks, upon deconvalution reveal binding energies in the ranges representative of metal silicate and silica.

EXAMPLE 18

A solvent free formulation having the following components was prepared:

| COMPONENT | SUPPLIER | AMOUNT |
|---|---|---|
| Polybutene | H-50/AMOCO | 58–63 wt. % |
| urethane | F-34 m-100 Reichhold Chem. | 14–16% |
| silica | Cab-o-sil TS 720 Cabot Corp. | 4–6% |
| Ca-silicate | Hubersorb 600 Huber Corp. | 6–10% |
| Li-Stearate | Reagens of Canada | 4–8% |
| linseed oil | OKO-S70 ADM | 4–6% |

The formulation was prepared by adding the polybutene base oil into a into 600 mL stainless steel beaker mixing container. The OKO S70 linseed oil was added and stirred into the polybutene to form a first mixture. The mixture was heated to a temperature of 150 F. by placing the mixing container on a hot plate.

Using a mixing apparatus similar to one described above in Example 10, the powdered components of the formulation were admixed into the heated base oil (or first mixture). The powdered components were added gradually until the admixture is relatively thick.

A second mixture was prepared by heating the Urethane to a temperature of 150 F. thereby forming a liquid. The second mixture was introduced into the first mixture and blended in the 600 mL stainless steel beaker until smooth. A vacuum was applied to the formulation to remove any entrained air. The formulation was allowed to cool to room temperature before testing or application.

The thermal stability of the formulation was tested in accordance with Example 11 above. The formulation sustained heat at 220 F. for 7 days with no visible adverse affects. The hydrothermal stability of the formulation was tested in accordance with Example 11 above for a period 24 hrs. at 240–250 F. at a pressure of 1 atmosphere(gage). No adverse affects were visually detected. The corrosion resistance of the formulation was tested in accordance with the B117 salt corrosion procedures set forth above in Example 11. After 10 days exposure, a 0.010 in. thickness coating of the formulation upon a steel test panel possessed less than 5% surface area red rust.

The formulation was applied upon a steel panel and covered with wollastonite insulation in order to determine oil loss into the insulation. The insulation was removed and inspected for oil migrating from the formulation into the insulation. After a period of 7 days, less than 15 wt. % of the oil had been absorbed by the insulation.

EXAMPLE 19

A solvent free formulation having the following components was prepared:

| COMPONENT | SUPPLIER | AMOUNT |
|---|---|---|
| Polybutene | H-50/AMOCO | 58–63 wt. % |
| epoxy | Epon SU 2.5/Shell Oil | 14–16% |
| silica | Cab-o-sil TS 720 Cabot Corp. | 4–6% |
| Ca-silicate | Hubersorb 600 Huber Corp. | 6–10% |
| Li-Stearate | Reagens of Canada | 4–8% |
| linseed oil | OKO-S70 ADM | 4–6% |

The formulation was prepared by adding the polybutene base oil into a into 600 mL stainless steel beaker mixing container. The OKO S70 linseed oil was added and stirred into the polybutene to form a first mixture. The mixture was heated to a temperature of 150 F. by placing the mixing container on a hot plate. Using a mixing apparatus similar to one described above in Example 10, the powdered components of the formulation were admixed into the heated base oil (or first mixture). The powdered components were added gradually until the admixture is relatively thick.

A second mixture was prepared by heating the SU2.5 epoxy to a temperature of 150 F. thereby forming a liquid. The second mixture was introduced into the first mixture and blended in a 600 mL stainless steel beaker until smooth. A vacuum was applied to the formulation to remove any entrained air. The formulation was allowed to cool to room temperature before testing or application.

The thermal stability of the formulation was tested in accordance with Example 11 above. The formulation sustained heat at 250 F. for 3 days and at 300 F. for 10 days with no visible adverse affects. The hydrothermal stability of the formulation was tested in accordance with Example 11 above for a period 24 hrs. at 240–250 F. at a pressure of 1 atmosphere. No adverse affects were visually detected. The corrosion resistance of the formulation was tested in accordance with the B117 salt corrosion procedures set forth above in Example 11. After 10 days exposure, a 0.010 in. thickness coating of the formulation upon a steel test panel possessed less than 5% surface area red rust.

For best results, the liquid components, e.g., polybutene, are added to a mixing vessel and heated to a temperature of about 150 to 160 F. After mixing at the elevated temperature, a vacuum is applied to removed entrained air, e.g., a vacuum of about 20 to 25 inches. The solid components, e.g., fumed silica, are introduced to the bottom of the heated mixing vessel and into the liquid components, and continue to heat and mix while drawing the vacuum. Resinous components, e.g., epoxy, are added to the mixing vessel.

EXAMPLE 20

A prep-coating or primer formulation having the following formulation was prepared:

| COMPONENT | SUPPLIER | AMOUNT |
| --- | --- | --- |
| polybutene | L-50 or L-14/AMOCO | 96–98% |
| silica | Cab-o-sil TS 720/Cabot Corp | 1–2% |
| ca-silicate | Hubersorb 600/Huber Corp | 1–2% |

The components of this formulation were admixed in accordance with the method described in Example 7. This formulation can be applied upon a 2 inch iron pipe as a primer or pre-coating before application of a CUI inhibitor such as the formulation described in Examples 18 and 19. The primer functions to penetrate surface non-uniformities and scale.

EXAMPLE 21

This Example demonstrates lanolin containing gel formulations. These formulas can be used to reduce corrosion on wire ropes. These formulations can be introduced into the wire rope during manufacture or thereafter by hand or pressure application methods.

| SUPPLIER | COMPONENT | Wt. % | Wt. % | Wt. % | Wt. % | Wt. % | Wt. % | Wt. % | Wt. % |
| --- | --- | --- | --- | --- | --- | --- | --- | --- | --- |
| Lanactex Products Inc. | Lanolin USP | 32.50 | 5.00 | 13.75 | 13.75 | 13.75 | 10.00 | 14.50 | 10.50 |
| Cabot Corporation | Cabosil TS-720, Fumed Silica | 6.50 | 6.50 | 6.50 | 6.50 | 6.50 | 6.50 | 6.80 | 6.80 |
| Reagens Comiel Canada | Lithium Stearate | | | | 5.00 | | 10.00 | | 10.50 |
| Witco Corporation | SAC1760, Calcium Sulfonate | | | | | | 5.00 | 5.00 | |
| Shamrock Technologies | S-395-N5 Polyethylene | | 27.50 | 5.00 | | | | | |
| Shell Chemical Company | EPON Resin SU-2.5, Epoxy Resin | | | 13.75 | 13.75 | 13.75 | 7.50 | 14.50 | 8.00 |
| Amoco Chemical Company | Durasyn 174 PAO, Polyalfaolefin Oil | 61.00 | 61.00 | 61.00 | 61.00 | 61.00 | 61.00 | 64.20 | 64.20 |

These formulations were prepared by heating the polyalphaolefin oil to a temperature of 150 F. in a 600 mL stainless steel beaker mixing container. While maintaining the temperature at 150 F., the lanolin component was mixed into the oil with a glass stirring rod thereby forming a mixture. The remaining components were blended together and introduced into the mixture.

Each of these formulations was tested for corrosion resistance in accordance with Federal Test Standard 791c, Method 4001.3 (20% salt spray). The formulation was applied with an adjustable gate applicator onto standard cold roll steel test panels (ACT Laboratories) at approximately 0.008 inches thick and placed into a testing chamber. Each of the formulations survived 1 4days salt spray without any visible signs of rust.

EXAMPLE 22

This Example demonstrates using sodium silicate powders having a relatively small particle size in a wide range of formulations. These Examples were prepared in accordance with the method described in Example 21. These formulations were tested in accordance with the methods described above in Example 21 and survived 14 days in salt spray without any visible signs of rust.

| SUPPLIER | COMPONENT | Wt. % | Wt. % | Wt. % | Wt. % | Wt. % | Wt. % | Wt. % | Wt. % |
|---|---|---|---|---|---|---|---|---|---|
| Lanactex Products Inc. | Lanolin USP | | 5.00 | | 13.75 | 10.00 | 10.00 | 10.00 | 14.70 |
| Cabot Corporation | Cabosil TS-720, Fumed Silica | 6.50 | 6.50 | 6.50 | 6.50 | 6.50 | 6.50 | 6.50 | 6.60 |
| Reagens Comiel Canada | Lithium Stearate | | | | | 10.00 | 10.00 | 7.50 | 4.90 |
| Witco Corporation | SAC1760, Calcium Sulfonate | | | | | | 2.50 | 2.50 | 7.40 |
| Shamrock Technologies | S-395-N5 Polyethylene | | 27.50 | 27.50 | | | | 5.00 | 2.50 |
| FQ Corporation | Sodium Silicate (less than 200 mesh) | 32.50 | | 5.00 | 5.00 | 5.00 | 2.50 | 2.50 | 2.50 |
| Shell Chemical Company | EPON Resin SU-2.5, Epoxy Resin | | | | 13.75 | 7.50 | 7.50 | 5.00 | 7.40 |
| Amoco Chemical Company | Durasyn 174 PAO, Polyalfaolefin Oil | 61.00 | 61.00 | 61.00 | 61.00 | 61.00 | 61.00 | 61.00 | 54.00 |

EXAMPLE 23

A formulation having the following formulation was prepared in accordance with Example 11.

| COMPONENT | SUPPLIER | AMOUNT |
|---|---|---|
| Polybutene | H-50 AMOCO | 58–63 wt. % |
| Epoxy Resin | EP0tuf 692 - Reichhold Chemical | 15–20 wt. % |
| Linseed Oil | OKO S70-ADM | 2–5 wt. % |
| Fumed Silica (Cab-o-sil) | TS720 - Cabot Corp. | 4–6 wt. % |
| Sodium Silicate | >200 mesh PQ Corp | 8–10 wt. % |
| Lithium Stearate | Reagens - Reagen Co. Canada | 4–7 wt. % |

EXAMPLE 24

The corrosion resistance or ability of the inventive grease/gel described in Examples 13 and 23 to inhibit rust formation was determined in accordance with "Measurement of Corrosion Under Insulation and Effectiveness of Protective Coatings" by Dharma Abayaratha et al., March 1997, NACE International; the disclosure of which is hereby incorporated by reference. This testing method determines the rate of corrosion as a function of electrical resistance.

The results of this determination are better understood by reference to FIG. 1. Referring now to FIG. 1, FIG. 1 is a graphical representation of the corrosion rate of unprotected steel pipe (Plot A), a steel pipe coated with the formulation of Example 23 (Plot B) and a steel pipe coated with the formulation of Example 13 (Plot C). A layer of pearlite insulation was placed over all of the test pipes. Each of the pipes was exposed to an environment that cycled between salt water at 150 F. to drying at 230 F. As illustrated by FIG. 1, Plot A, an unprotected pipe corrodes rapidly under insulation whereas the inventive grease/gel reduces, if not eliminates, corrosion under insulation.

EXAMPLE 25

This Example illustrates one method for spraying an inventive grease-gel composition upon a metal surface. The following two compositions were prepared in accordance with Example 19, and were sprayed individually upon a flat steel surface:

| Component | Component Name | Component Manufacturer | Component Percent |
|---|---|---|---|
| polybutene | Indopol H-50 | Amoco Chemical Co. | 61% |
| linseed oil | OKO-S-70 | ADM Corp. | 5% |
| epoxy resin | Epon SU-2.5 | Shell Chemical Co. | 15% |
| silica | Cabosil TS-720 | Cabot Corp. | 5% |
| ca-silicate | Hubersorb 600 | J. M. Huber Corp. | 8% |
| li-stearate | Lithium Stearate | Reagens Canada LTD | 6% |
| polybutene | Indopol H-50 | Amoco Chemical Co. | 61% |
| linseed oil | OKO-S-70 | ADM Corp. | 5% |
| urethane resin | Spenkel F34-M-100 | Reichhold Chemical Co. | 15% |
| silica | Cabosil TS-720 | Cabot Corp. | 5% |
| ca-silicate | Hubersorb 600 | J. M. Huber Corp. | 8% |
| li-stearate | Lithium Stearate | Reagens Canada LTD | 6% |

These two compositions were diluted with a combination of mineral spirits and reagent alcohol at a ratio of 5:1 to 7:1 parts. The combined diluent was present at 12 to 13 wt. % of the mixture to be sprayed. The compositions were sprayed by using a Graco 10:1 air pump sprayer, Model #207-352, Series I97 F, or a Graco 5:1 air pump sprayer, Model #205-997, Series E4G. The Air Pressure setting for the pumps was 50 PSI; Inlet Pressure to pump-50 PSI; Fluid Flow-100 PSI. The average thickness for Compositions I and II was 0.050 in., 4.5 sq. ft. coverage per lb. of material, and the application time to cover 1 sq. yd. was 6 minutes.

If desired, a coating can be applied upon a rough or corroded surface (with no loose debris) before spraying the previously described compositions. A suitable pre-treatment or prep-coat comprises the formulas shown below. The prep-coat works well on heavily rusted surfaces, soaking into the rusted areas and allowing for less base oil in the overlying coatings to be drawn out. The following two prep-coat compositions were prepared by adding the fumed silica and calcium silicate to the polybutene oil or pre-blended polybutene oil and linseed oil and mixed at 2000 rpm for 15 minutes utilizing a Design D dispersion blade (INDCO) mounted on a Premier Mill Series 2000 model 84 laboratory dispersator.

| COMPONENT | NAME | SUPPLIER | AMOUNT |
|---|---|---|---|
| Comp I Prepcoat | | | |
| polybutene oil | L-50 | Ideas Inc. | 98 wt. % |
| fumed silica | TS 720 | Cabot Corp. | 1% |
| Ca-silicate | Hubersorb | Huber Corp. | 1% |
| Comp II Prepcoat | | | |
| polybutene oil | L-50 | Ideas Inc. | 49 wt. % |
| linseed oil | Alinco Y | ADM | 49% |
| fumed silica | TS 720 | Cabot Corp. | 1% |
| Ca-silicate | Hubersorb | Huber Corp. | 1% |

EXAMPLE 26

This Example demonstrates the ability of the gel to form a non-tacky exterior layer or film. This exterior layer imparts improve water repellency to an applied gel. Such resistance is desirable when employing the gel in outdoor environments such as piping and infrastructure, e.g., insulated pipes in a chemical processing facility.

The gel composition of Example 19 was applied as a 1/16 inch film onto a steel pipe. The applied gel was heated in an oven by increasing to a temperature of about 120 to 150 C. The color of the applied gel change from white to tan within 48 hours from the heat treatment. The surface tackiness of the gel was reduced as a result of a relatively firm exterior film or layer formed upon the gel surface. The portion of the gel underlying the exterior film remained tacky and fluid.

EXAMPLE 27

This Example illustrates an inventive gel that employs an EPL base oil comprising soy bean oil. The compositions were prepared by heating the soy salad oil to 150 F. and adding the lanolin while mixing in a mixing bowl until the lanolin was dissolved and completely dispersed. Next the fumed silica was added and mixed by hand until all the powder was wetted out and then mixed at 2500–3,000 RPM in a mixing bowl for 15minutes. The lithium stearate and polyethylene were added and mixed for 5 minutes, and followed by the epoxy resin with subsequent mixing for 10 minutes. At this time the batch was mixed at 2,500–3,000 RPM for an additional 15 minutes. Calcium sulfonate was added to the batch and mixed at 2,500–3,000 RPM for 10 minutes.

| COMPONENT | DESCRIPTION | SUPPLIER | WT % A | B |
|---|---|---|---|---|
| Soybean oil | Soy Salad Oil | (ADM Corp.) | 53.5% | 57.8% |
| Lanolin | USP | (Lanaetex Corp.) | 15.0% | 16.2% |
| fumed silica | Cabosil TS-720 | (Cabot Corp.) | 6.5% | 7.0% |
| Lithium Stearate | commercial grade | (Reagens Canada) | 5.0% | 5.5% |
| polyethylene | S-395-N5 | (Shamrock Technol.) | 2.5% | 2.7% |
| >200 mesh | Sodium Silicate | (PQ Corp.) | 2.5% | 2.7% |
| epoxy resin | Epon SU-2.5 | (Shell Chemical) | 7.5% | 8.1% |
| ca-sulfonate | Lockguard B8260 | (Lockhart) | 7.5% | |

Formulations A and B were repeated except that the sodium silicate was replaced with calcium silicate (Hubersorb 600 supplied by J. M. Huber). These formulations are useful as a biodegradable lubricant; especially for marine applications.

EXAMPLE 28

The following compositions are prepared in accordance with the method of Example 27:

| COMPONENT | DESCRIPTION | SUPPLIER | WT % |
|---|---|---|---|
| FORMULA 1 | | | |
| Soybean Oil | Soybean Oil | (Soy-Co LLC) | 60.00% |
| Sodium Silicate | Baghouse Fines | (PQ Corp.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| FORMULA 2 | | | |
| Soybean Oil | Soybean Oil | (Soy-Co LLC) | 60.00% |
| Sodium Silicate | G Grade | (PQ Corp.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| FORMULA 3 | | | |
| Soybean Oil | Soybean Oil | (Soy-Co LLC) | 49.50% |
| Sodium Silicate | Baghouse Fines | (PQ Corp.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| Lanolin | Lanolin, USP | (Lanaetex Corp.) | 10.00% |
| a-Tocopherol Acetate | Vitamin E Acetate | (BASF) | 0.50 |
| FORMULA 4 | | | |
| Soybean Oil | Soybean Oil | (Soy-Co LLC) | 49.50% |
| Sodium Silicate | G Grade | (PQ Corp.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| Lanolin | Lanolin, USP | (Lanaetex Corp.) | 10.00% |
| a-Tocopherol Acetate | Vitamin E Acetate | (BASF) | 0.50% |
| FORMULA 5 | | | |
| Soybean Oil | Soybean Oil | (Soy-Co LLC) | 60.00% |
| Calcium Silicate | Hubersorb 600 | (D&F Distrib.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| FORMULA 6 | | | |
| Soybean Oil | Soybean Oil | (Soy-Co LLC) | 49.50% |
| Calcium Silicate | Hubersorb 600 | (D&F Distrib.) | 5.00% |
| Fumed silica | Cabosil TS-720 | (Cabot Corp.) | 10.00% |
| Lithium Stearate | Commercial grade | (Reagens Canada) | 10.00% |
| Oil Modified Urethane | Spenkel F-34-M-100 | (Reichhold) | 15.00% |
| Lanolin | Lanolin, USP | (Lanaetex Corp.) | 10.00% |
| a-Tocopherol Acetate | Vitamin E Acetate | (BASF) | 0.50% |
| FORMULA 7 | | | |
| Soybean Oil | Soybean Oil | (Soy-Co LLC) | 85% |
| Fumed Silica | Cabosil TS-720 | (D&F Distrib.) | 2.0% |
| Calcium silicate | Hubersorb 600 | (D&F Distrib.) | 3.0% |
| D'limonene | citrus product | commodity | 10% |

If desired, the soybean base oil can be replaced with a blend of soybean oil with at least one synthetic oil, e.g. polyalphaolefin, polybutene, among others.

EXAMPLE 29

The formulation listed below was produced by adding powdered materials to the PAO base oil, i.e., polymerized 1-decene. The PAO oil was poured into a 1 quart stainless steel bowl. The powdered materials were then added to the PAO and mixed by hand.

| NAME | COMPONENT | SUPPLIER | AMOUNT WT. % BY |
|---|---|---|---|
| Durasyn 174 PAO | base oil | Ideas, Inc. | 59.0% |
| Cabosil TS-720 | Silica | Cabot Corp. | 10.0% |
| G | sodium silicate | PQ Corp. | 25.0% |
| Borogard ZB | zinc borate | U.S. Borax | 5.0% |
| Indigo Blue | dye | Tricon Colors Inc. | 1.0% |

This composition, when applied to a standard ACT electrogalvanized steel test panel (E60 EZG 60G 2 side 03×06× 030) to a thickness of 1/16 inch, protects from red corrosion for a minimum of 1000 hours in accordance with ASTM B117 salt spray exposure. When the composition was removed from the panel after a minimum of 24 hours by carefully scraping off the excess and then washing with naphtha, an average of 192 hours of ASTM B117 salt spray exposure was obtained prior to the appearance of red corrosion products compared to 120 hours for untreated control samples.

EXAMPLE 30

The formulation provided below was prepared by the method described in Example 27:

| COMPONENT | DESCRIPTION | SUPPLIER | WT % |
|---|---|---|---|
| Polyalphaolefin Oil | Durasyn 174 PAO | (Ideas, Inc.) | 53.5% |
| Lanolin | USP | (Lanaetex Corp.) | 15.0% |
| fumed silica | Cabosil TS-720 | (Cabot Corp.) | 6.5% |
| Lithium Stearate | commercial grade | (Reagens Canada) | 5.0% |
| polyethylene | S-395-N5 | (Shamrock Technol.) | 2.5% |
| >200 mesh | Sodium Silicate | (PQ Corp.) | 2.5% |
| epoxy resin | Epon SU-2.5 | (Shell Chemical) | 7.5% |
| ca-sulfonate | Lockguard B8260 | (Lockhart) | 7.5% |

The above composition was applied to a standard steel ACT 3"X6"X0.032" test panel in a uniform thickness of 0.008 in. thick and exposed to ASTM-B117 salt spray for 1728 hours (72 days). After the exposure period the gel composition was removed and the underlying substrate steel had developed corrosion on only 1–2 % of its surface.

EXAMPLE 31

The formulation provided below was prepared by the method described in Example 27:

| COMPONENT | DESCRIPTION | SUPPLIER | WT % |
|---|---|---|---|
| Polybutene Oil | Indopol H-25 | (Ideas, Inc.) | 45.0% |
| Lanolin | USP | (Lanaetex Corp.) | 10.0% |
| fumed silica | Cabosil TS-720 | (Cabot Corp.) | 5.0% |
| Lithium Stearate | commercial grade | (Reagens Canada) | 5.0% |
| polyethylene | S-395-N5 | (Shamrock Technol.) | 5.0% |
| >200 mesh | Sodium Silicate | (PQ Corp.) | 20.0% |
| epoxy resin | Epon SU-2.5 | (Shell Chemical) | 5.0% |
| ca-sulfonate | SACI 760 | (Witco Corp.) | 5.0% |

The above composition has a penetration value of 291 (ASTM-D217), and an NLGI2 grade grease consistency.

EXAMPLE 32

The inventive compositions described in Examples 25 and 30 were prepared in accordance with the method described in Examples 19 and 27 respectively. The composition was tested in accordance with ASTM E-729-88a. A 96 hour static acute toxicity screening test with saltwater mysid (Mysidopsis bahia) was preformed. All of the mysid appeared normal after 96 hour exposure to concentrations of the composition ranging from 1 mg/L to 100 mg/L. This result illustrates the inventive composition is non-toxic.

EXAMPLE 33

The following Example illustrates compositions that form a self-supporting outer layer or skin. Additives were incorporated into the gel of Example 19 by hand mixing. If desired, mechanical mixers are also a means of dispersing the additives throughout the grease, e.g., to incorporate the additives in the initial mixing process.

The following samples were formulated to evaluate depth of cure, reactivity to differing light sources, and toughness of film. The components of the samples are given in parts.

| Sample | Gel | CN111 | Darocure 1173 | Irgacure 819 | TiO2 |
|---|---|---|---|---|---|
| A | 100 | 20 | 2 | | |
| B | 100 | 20 | 3 | | |
| C | 100 | 20 | 3 | | 1 |
| D | 100 | 20 | | 2 | 1 |
| E | 100 | 20 | | 2 | |
| F | 100 | 20 | | 3 | |
| G | 100 | 20 | | 3 | 1 |
| H | 100 | 20 | | 2 | 1 |

CN111 comprises an epoxidized soybean oil (supplied by Sartomer). Darocure 1173 comprises a acetophenoc based photoinitiator (supplied by Ciba). Irgacure 819 comprises a phosphene oxide photoinitiator (supplied by Ciba), TiO2 titanium dioxide was employed as a pigment to control the thickness of the self-supporting layer.

The Samples described above where then applied onto an ACT steel test panel and exposed to various sources of UV light. The thickness of the resultant self-supporting layer are described below.

| Sample | Sunlight exposure | UV(1.6 J/cm2) | UV(.8 J/cm2) |
|---|---|---|---|
| A | skin | skin | skin |
| B | skin | skin | skin |
| C | skin | slight skin | slight skin |
| D | slight skin | slight skin | slight skin |
| E | skin | skin | skin |
| F | skin | skin | skin |
| G | skin | skin | skin |

-continued

| Sample | Sunlight exposure | UV(1.6 J/cm2) | UV(.8 J/cm2) |
|---|---|---|---|
| H | skin | skin | skin |

The above samples were also exposed to conventional fluorescent lighting without any visually detected affect. The heat tolerance and corrosion resistance (ASTM B-117) of the above samples was tested.

Heat Tolerance was measured by oven heat aging at 350 F. ACT Steel Panels were coated with each of the above samples having a thickness starting at 0.005 in. at one end, tapering out to 0.030 in. at the other end of the panel. The coated panels were placed outside for UV (8 hour) cure, set inside overnite, and then placed into the oven at 350 F. The coated panels remained in the oven for over 500 hours without cracking or excessive chalking.

The heat tolerance test was repeated except that the samples were applied onto on a 3 in. dia. steel pipe. The coated pipes were exposed to UV light as described above and placed into an oven at 350 F. The coated pipes remained in the oven for over 350 hours without cracking or excessive chalking.

Corrosion Resistance was measured in accordance with ASTM-B117 (salt fog). ACT Steel Panels were coated with each of the above samples having a thickness starting at 0.005 in. at one end, tapering out to 0.030 in. at the other end of the panel. The coated panels were placed outside for UV (8 hour) cure, set inside overnite, and then placed into a B-117 salt chamber. The coated panels remained in the salt chamber for over 500 hours with corrosion failure.

EXAMPLE 34

The following formulations were prepared in accordance with Example 19. These formulations are especially suitable for use in lubricating and preventing corrosion in roller chain and links. In such an application these formulations are preferably ultra-sonically or vacuum infiltrated into the chain. The rate of application can be enhanced by heating the formula.

| TRADE NAME/SUPPLIER | COMPONENT | AMOUNT |
|---|---|---|
| FORMULA 1 | | |
| Alinco Y-ADM | linseed oil | 32–35 wt % |
| L-50-Ideas Inc. | polybutene oil | 32–35% |
| Hubersorb 600-Huber | Ca-silicate | 1–2% |
| TS 720 Cabosil-Cabot | silica | 1–2% |
| Ultraflex-Bareco | amber wax | 6% |
| 12 hydroxy-Witco | Li-stearate | 2% |
| Durad 310 M-FMC | Triphenyl Phosphate | 1% |
| RI-CA-J. T. Vanderbilt | calcium sulfonate | 22–25% |
| FORMULA 2 | | |
| Alinco Y-ADM | linseed oil | 31–33 wt % |
| L-50-Ideas Inc. | polybutene oil | 31–33% |
| Hubersorb 600-Huber | Ca-silicate | 5% |
| TS 720 Cabosil-Cabot | silica | 1–2% |
| Ultraflex-Bareco | amber wax | 4–5% |
| 12 hydroxy-Witco | Li-stearate | 2% |
| Durad 310 M-FMC | Triphenyl Phoshate | 1% |
| RI-CA-J. T. Vanderbilt | calcium sulfonate | 20–22% |

EXAMPLE 35

This Example demonstrates the ability of the inventive grease/gel to reduce stress crack corrosion. These tests were conducted on stressed U-bend specimens made from AISI 304 stainless steel. Duplicate specimens were exposed in the untreated condition and also following application of the composition described in Example 19. Both untreated specimens exhibited evidence of localized corrosion and stress corrosion cracking (SCC). By comparison the specimens treated with the inventive composition were free of localized corrosion and cracking in the same test exposure.

Four U-bend specimens were made from AISI 304 stainless steel. These specimens were given a senitization heat treatment at 1200 F. (650 C.) for 8 hours prior to stressing and exposure. Two specimens were left untreated and two were treated with the inventive composition. Six defected areas were made in the treated layer and cotton wicks were placed in these regions to retain moisture.

The U-bend specimens were placed over a stainless steel pipe section and stressed. The exposure sequence was substantially the same as that described in ASTM C692. This consisted of applying foam glass thermal insulation around the U-bend specimens that conformed to their shape. Once assembled, a 1500 C1" solution (2.473 g/L NaCl) was continuously introduced to the tension surface of the specimens through holes in the insulation. The flow rate was regulated to achieve partial wet/dry conditions on the test specimen. The pipe section was internally heated using a cartridge heater and a heat transfer fluid and test temperature controlled at 160 F. The test was run for a period of 100 hours followed by examination of the test specimens.

Both untreated U-bend specimens showed evidence of SCC originating from regions of localized corrosion on the tension surface. The cracks are shown in FIG. 1 which indicate the branched nature of the cracking. By comparison, as indicated in FIG. 2, neither of the two U-bend specimens treated with EDC 2000 showed any evidence of localized corrosion or SCC.

EXAMPLE 36

These tests were conducted to examine the influence of gel surface treatments on the susceptibility of AISI 304 stainless steel coupons. The tests revealed improvement in pitting resistance for samples following surface treatment with the inventive composition of Example 19.

Four corrosion coupons of AISI 304 stainless steel were used in this example. One specimen was tested without surface treatment. Two additional specimens were tested following hand application of the inventive composition one of which contained a defected region consisting of a "X" across the face of the specimen.

The test specimens were exposed according to ASTM G48 Method A (Ferric Chloride Pitting Test). These tests consisted of exposures to a ferric chloride solution (about 6 percent by weight) at room temperature for a period of 72 hours.

The results of the corrosion tests are given in the following Table. They indicate the order of corrosion performance in terms of maximum pit penetration rate (from best to worst) was as follows: (1) inventive gel of Example 19, (2) gel treatment with "X" defects, (3) No treatment. There were minimal visible signs of localized attack on the coupon with the full EDC 2000 treatment. However, all other conditions showed significant areas of pitting. Attack on the coupon with the full treatment and the "X" defect was mainly limited to the region of the defect and on the ends of the coupon.

TABLE

Results of ASTM G48 Pitting Tests

| Sample | Max. Pit Depth (mils) | Pit Penetration Rate (mpy) | Comments |
|---|---|---|---|
| Control | 5.51 | 670 | Largest pits on edges. Smaller pits on surface. |
| Treated with Gel and "X" | 4.72 | 575 | Pits in area of "X" and on edges |
| Gel Treated | 0.24 | 28.7 | Very limited pitting on edges only. |

ASTM G-48, 304 SS Coupons Exposure to Ferric Chloride, 72 Hours, Ambient Temperature

| SAMPLE | INITIAL WEIGHT (g) | WEIGHT AFTER TEST (g) | WEIGHT AFTER TEST CLEANED (g) | SCALE WEIGHT (g) | WEIGHT LOSS (g)* | SURFACE AREA (sq. in) | TIME (hrs) | DENSITY (g/cc) | CORR. RATE (mpy) |
|---|---|---|---|---|---|---|---|---|---|
| (Bare Steel) | 28.6496 | 27.7753 | 27.7279 | −0.8743 | 0.9217 | 4.74 | 72.0 | 7.80 | 184.856 |
| (EDC 2000 with X) | 28.7616 | 28.6709 | 28.6663 | −0.0907 | 0.0953 | 4.75 | 72.0 | 7.80 | 19.093 |
| (EDC 2000 Full Co) | 28.6335 | 28.6267 | 28.6239 | −0.0068 | 0.0096 | 4.72 | 72.0 | 7.80 | 1.934 |

EXAMPLE 37

This Example demonstrates preparing an aerosol spray of the inventive grease or gel. The compositions of Examples 18, 19 and 25 (Comp. 2-Prep Coat) were each diluted with 30 wt. % of naphtha (mineral spirits). The propellants comprises A-70 (isobutene), dimethylether, and tetrafluoroethane (HFC-134a). The spray propellants were kept at a constant 30 mls/container while three different concentrations of each composition was were used, 150 gms, 130 gms, and 120 gms in the container. All of the compositions were dispensed by the propellant. HFC-134a was the most effective at dispensing a spray, whereas DME and A-70 dispensed a stream of the compositions. Those skilled in this art understand that the spray pattern can be tailored by selecting a preferred nozzle.

EXAMPLE 38

The following composition was prepared in accordance with Example 19.

| AMOUNT | COMPOSITION | SUPPLIER |
|---|---|---|
| 55% | Soy Salad Oil | ADM Corp. |
| 18% | Indopol L-50 Polybutene | Amoco |
| 20% | Lockgard 9245 Calcium Sulfonate | Lockhart Chemical Co. |
| 1% | Durad 150 Phosphate Ester | FMC Corp. |
| 2% | Cabosil TS-720 Fumed Silica | Cabot Corp. |
| 4% | Idatac C-357 Tackifier | Ideas, Inc. |

The composition can be diluted with about 30 to 40 wt. % mineral spirits or naphtha. If desired, the diluted composition can be combined with a propellant in order to dispense the composition as an aerosol. The composition, either as an aerosol or in bulk, is useful as a penetrating liquid for loosing corroded articles such as fasteners, bolts, nuts, among other articles subject to crevice corrosion.

EXAMPLE 39

The formulations in the following Table are based upon a soy oil base oil and were prepared in accordance with the method of Example 19. The second Table illustrated the penetration and corrosion resistance (as determined by ASTM B-117) for the formulations in the first Table.

| Soy Formulation Number | ADM Soy Salad Oil | Soyco L.L.C. Soybean Oil | Laneate x Lanolin USP | Cabot Corp. Cabosil TS-720 | T.O.W. Ind. Genie Gel | J. M. Huber Hubersorb 600 | Reagens Lithium Stearate | Shamrock Polyethylene S-395-N5 |
|---|---|---|---|---|---|---|---|---|
| 1 | 53.80 | | 15.10 | 6.50 | | | 5.00 | 2.50 |
| 2 | 57.80 | | 16.20 | 7.00 | | | 5.40 | 2.70 |
| 3 | | 60.00 | | 10.00 | | 5.00 | 10.00 | |
| 4 | 49.50 | | 10.00 | 10.00 | | 5.00 | 10.00 | |

-continued

| Soy Formulation Number | | | | | | | | |
|---|---|---|---|---|---|---|---|---|
| 5 | 50.00 | | 10.00 | 10.00 | | 5.00 | 10.00 | |
| 6 | | 50.00 | 10.00 | 10.00 | | 5.00 | 10.00 | |
| 7 | 60.00 | | | 10.00 | | 5.00 | 10.00 | 5.00 |
| 8 | 87.50 | | | 7.50 | | | 5.00 | |
| 9 | 77.50 | | | 7.50 | | | 15.00 | |
| 10 | 67.50 | | | 7.50 | | | 25.00 | |
| 11 | 75.00 | | | 10.00 | | | 15.00 | |
| 12 | | 70.00 | | 10.00 | | | 15.00 | |
| 13 | | 65.00 | 10.00 | 10.00 | | | 10.00 | |
| 14 | | | | 7.50 | | | 25.00 | |
| 15 | | 59.30 | | | 35.70 | | | |
| 16 | | 83.00 | | 10.00 | | | | |
| 17 | | 69.20 | | | 20.80 | | | |
| 18 | | 76.90 | 9.10 | 4.10 | | | | |
| 19 | | 76.90 | | 4.10 | | | | |
| 20 | | 54.50 | 7.00 | 9.40 | | 4.70 | 9.40 | |
| 21 | | 54.50 | 7.00 | 9.40 | | 4.70 | 9.40 | 7.50 |
| 22 | | 54.50 | 7.10 | 9.40 | | 4.70 | 9.40 | 7.50 |
| 23 | | 54.20 | | 9.30 | | 4.70 | 9.30 | 7.50 |
| 24 | | 61.50 | 15.00 | 9.40 | | 4.70 | 9.40 | |
| 25 | | 59.50 | | 10.20 | | 5.10 | 10.20 | |
| 26 | | 59.50 | | 10.20 | | 5.10 | 10.20 | |
| 27 | 57.00 | | | 9.50 | | 4.75 | 9.50 | 4.75 |
| 28 | 64.10 | | | 7.10 | | | 23.75 | |
| 29 | | 56.30 | | | 33.90 | | | |
| 30 | | 55.00 | | 10.00 | | 5.00 | 10.00 | |
| 31 | | 50.00 | | 10.00 | | 5.00 | 10.00 | |
| 32 | | 55.00 | | 10.00 | | 5.00 | 10.00 | |
| 33 | | 50.00 | | 10.00 | | 5.00 | 10.00 | |

| Soy Formulation Number | Lockhart Chemical Lockguard B826D | Lockhart Chemical Lockguard B9245 | Witco SAC1760 | PQ Corp. Baghouse Fines | Shell Epon SU 2.5 | Lockhart Chemical Tekcor 700 | Reickhold Spenkel F-34-M100 | Roche Vitamin E Acetate |
|---|---|---|---|---|---|---|---|---|
| 1 | 7.00 | | | 2.50 | 7.50 | | | |
| 2 | | | | 2.70 | 8.10 | | | |
| 3 | | | | | | | 15.00 | |
| 4 | | | | | | | 15.00 | 0.50 |
| 5 | | | | | | | | |
| 6 | | | | | | | | |
| 7 | 10.00 | | | | | | | |
| 8 | | | | | | | | |
| 9 | | | | | | | | |
| 10 | | | | | | | | |
| 11 | | | | | | | | |
| 12 | | | | 5.00 | | | | |
| 13 | | | | 5.00 | | | | |
| 14 | | | | | | | | |
| 15 | | | | | | 5.00 | | |
| 16 | | | | | | 7.00 | | |
| 17 | | | | | | 5.80 | | |
| 18 | | | | | | 5.80 | | |
| 19 | | | | | | 5.80 | | |
| 20 | | 7.50 | | | | 7.50 | | |
| 21 | | | | | | 7.50 | | |
| 22 | | 7.50 | | | | | | |
| 23 | | 7.50 | | | | 7.50 | | |
| 24 | | | | | | | | |
| 25 | | | | | | 15.00 | | |
| 26 | | 15.00 | | | | | | |
| 27 | 9.50 | | | | | | | |
| 28 | | | | | | | | |
| 29 | | | | | | 4.75 | | |
| 30 | | | | | | 15.00 | | |
| 31 | | | | | | 15.00 | | |
| 32 | | | | | | 15.00 | | |
| 33 | | | | | | 15.00 | | |

-continued

| Soy Formulation Number | Reickhold Aroplaz 12722 | Cntr Envir. Tech. Polystyrene in methyl soyate | Witco Lithium 12 Hydroxy Stearate | Lubrizol Lubrizol 31D8 | Hercules Ester Gum BD-SP | Amoco Indolpol H-300 | Florida Chemical d-Limonene |
|---|---|---|---|---|---|---|---|
| 1 | | | | | | | |
| 2 | | | | | | | |
| 3 | | | | | | | |
| 4 | | | | | | | |
| 5 | 15.00 | | | | | | |
| 6 | 15.00 | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | 67.50 | | | | | |
| 15 | | | | | | | |
| 16 | | | | | | | |
| 17 | | | 4.20 | | | | |
| 18 | | | 4.10 | | | | |
| 19 | | | 4.10 | 9.10 | | | |
| 20 | | | | | | | |
| 21 | | | | | | | |
| 22 | | | | | | | |
| 23 | | | | | | | |
| 24 | | | | | | | |
| 25 | | | | | | | |
| 26 | | | | | | | |
| 27 | | | | | | | 5.00 |
| 28 | | | | | | | 5.00 |
| 29 | | | | | | | 5.00 |
| 30 | | | | | | 5.00 | |
| 31 | | | | | | 10.00 | |
| 32 | | | | | 5.00 | | |
| 33 | | | | | 10.00 | | |

PENETRATION AND SALT SPRAY TEST RESULTS FOR SOY BASED GREASE FORMUATIONS

| Soy Formulation Number | Average Penetration (mm) | Pass/Fail (5% Red) | | | | AVG % Red |
|---|---|---|---|---|---|---|
| | | 10 Days | 15 Days | 20 Days | 25 Days | |
| 1 | 346 | Pass | Fail | | | |
| 2 | 315 | Borderline | Fail | | | |
| 3 | 243 | Fail | | | | |
| 4 | 235 | Fail | | | | |
| 5 | 212 | Fail | | | | |
| 6 | 225 | Fail | | | | |
| 7 | 218 | Pass | Fail | | | |
| 8 | 346 | Fail | | | | |
| 9 | 308 | Pass | Fail | | | |
| 10 | 287 | Fail | | | | |
| 11 | 260 | Pass | Pass | Fail | | |
| 12 | 229 | Pass | Pass | Fail | | |
| 13 | 258 | Pass | Fail | | | |
| 14 | N/A | N/A | N/A | N/A | | |
| 15 | 148 | Pass | Fail | | | |
| 16 | 384 | Fail | | | | |
| 17 | 186 | Pass | Pass | Fail | | |
| 18 | 190 | Pass | Fail | | | |
| 19 | N/A | Fail | | | | |
| 20 | 248 | | | | 37.4 | |
| 21 | 222 | | | | 15.2 | |
| 22 | 245 | | | | 31.8 | |
| 23 | 237 | | | | 52.4 | |
| 24 | 236 | | | | 66 | |
| 25 | 255 | | | | 9.7 | |
| 26 | 214 | | | | 82 | |
| 27 | N/A | | | | N/A | |
| 28 | N/A | | | | N/A | |
| 29 | N/A | | | | N/A | |
| 30 | 229 | | | | 34.7 | |
| 31 | 235 | | | | 31.6 | |
| 32 | 205 | | | | 26.9 | |
| 33 | 185 | | | | 19.8 | |

EXAMPLE 40

The formulations described in Examples 19, 23 and 25 are repeated with the exception that the base oil comprises soy oil. These formulations can also include at least one of antioxidants and antimicrobial agents. These formulations can be employed upon terminal posts of conventional lead based batteries for reducing corrosion.

EXAMPLE 41

The following Tables illustrate UV curable compositions. The compositions amounts are given in grams. Best results are obtained by using samples 8, 18, 19 and 23–32. These compositions can be sprayed upon a surface, e.g., metallic surface, exposed to a source of UV radiation including the sun. The cured coating can be painted or further coated.

| SAMPLE NO. | | | | 01 | 02 | 03 | 04 | 05 | 06 | 07 | 08 |
|---|---|---|---|---|---|---|---|---|---|---|---|
| RESIN/RUBBER | LUCANT 2000 | ethylene alpha olefin | Mitsui Chemical | 35 | 30 | | 15 | 20 | | | |
| | LUCANT 600 | ethylene alpha olefin | Mitsui Chemical | | | | | | | | |
| | RICON 131 5MA | maleinized poybutadiene | Ricon Resins | | | | | | | 20 | |
| | TRILENE 65/ DURASYN | 1:1 ethylene propylene copolymer/poly alpha olefin blend | Amoco (durasyn) | | | | | | 30 | | |
| | RICON 100 | polybutadien | Ricon Resins | | | | | | | | |
| | RICON 184 | polybutadien | Ricon Resins | | | | | | | | |
| | RICON 134 | polybutadien | Ricon Resins | | | | | | | | |
| | NIPOL 1312 | butadien acrylontrile copoymer | Zeon Chemical | | | | | | | | |
| | TRILENE 65 | ethylene propylene copolymer | Uniroyal | | | | | | | | |
| | KRATON 1203 | ethylene butylene polymer | Shell | | | | | | | | |
| | KRATON 207 | ethylene butylene polymer | Shell | | | | | | | | |
| | VITON A-100 | flouroelastomer | Dupont Dow | | | | | | | | |
| CURABLES | CN 111 | epoxidized soy bean oil acrylate | Sartomer | 25 | 29 | 33 | 39 | 39 | 29 | 29 | 78 |
| | CL 1039 | urethane monoacrylate | UCB Radcure | | | | | 10 | | | |
| OILS/PLASTICIZERS | DURASYN/P104 | 3:2 poly alpha olefin/phenolic resin blend | Arizona Chemical (P104) | | | | | | | 15 | |
| | P 550 | polyester glutarate | C. P. Hall | | 25 | 44 | 25 | 10 | 20 | 15 | |
| | SF96-350 | silicone fluid | GE Silicones | 20 | | | | | | | |
| PHOTOINITIATORS | IRGACURE 819 | trimethylbenzoyl-phenylphosphineoxide | Ciba | | | | | | | | |
| | DAROCURE 1173 | hydroxymethylphenyl-propanone | Ciba | 3 | 4 | 4 | 4 | 5 | 4 | 4 | 8 |
| | IRGACURE 184 | hydroxycyclohexyl phenylketone | Ciba | | | | | | | | |
| | IRGACURE 500 | 1:1 hydroxycyclohexyl phenylketone/benzophenone blend | Ciba | | | | | | | | |
| ADDITIVES | LICA 44 | neopentyl[diallyl]oxy, tri(N-ethylenediamino) ethylzirconate | Kenrich Petro-chemical | | | | | | | | |
| | TEXOPHOR SPECIAL | anionic surfactant | Henkel | 1 | 1 | 2 | 2 | 2 | 2 | 2 | 2 |
| | IRGACOR 153 | succinic acid amine salt | Ciba | | | | | | | | |
| | TINUVIN 292 | hindered amine | Ciba | | | | | | | | |
| ANTIOXIDANT | IRGANOX 1010 | hindered phenolic | Ciba | 1 | 1 | 1 | 1 | 1 | 1 | 1 | 1 |
| CORROSION CONTROL | H-600 | calcium silicate | Huber | 8 | 8 | 8 | 10 | 10 | 10 | 12 | 10 |
| | LITHIUM STEARATE | lithium stearate | Reagens | 6 | | | 4 | 4 | 4 | 4 | 4 |
| | BN ZPG | boron nitride | ZYP Coatings | | 6 | | | | | | |
| PIGMENT | RUTILE R900 | TiO$_2$ | Dupont | 1 | 1 | 1 | 1 | 1 | 1 | 1 | |
| VISCOSITY CONTROL/MISC. | GILSONITE | hydrocarbon resin | Lexco | | 5 | 6 | 0 | 0 | 4 | 4 | 4 |
| | PKHP 200 | phenoxy resin | Phenoxy Specialists | | | | | | 2 | | |
| FILLERS | NYAD G | wallastonite | Nyco | | | | | | | | |
| | TS 610 | treated fumed silica | Cabot | 0 | 6 | 5 | 0 | 1 | 4 | 0 | 6 |
| | BARAGEL 10 | bentonite clay | Elementis | | | | | | | | |
| | F30D | micropsheres | Pierce & Stevens | | | | | | | | |
| | TOTAL | | | 100 | 116 | 104 | 101 | 105 | 109 | 107 | 113 |

| SAMPLE NO. | | | | 09 | 10 | 11 | 12 | 13 | 14 | 15 | 16 |
|---|---|---|---|---|---|---|---|---|---|---|---|
| RESIN/RUBBER | LUCANT 2000 | ethylene alpha olefin | Mitsui Chemical | 30 | | | 20 | 20 | | | |
| | LUCANT 600 | ethylene alpha olefin | Mitsui Chemical | | 30 | | | | | 10 | 10 |
| | RICON 131 5MA | maleinized poybutadiene | Ricon Resins | | | 30 | | | | | |
| | TRILENE 65/ DURASYN | 1:1 ethylene propylene copolymer/poly alpha olefin blend | Amoco (durasyn) | | | | | | | | |
| | RICON 100 | polybutadien | Ricon Resins | | | | | | 30 | 20 | 20 |
| | RICON 184 | polybutadien | Ricon Resins | | | | | | | | |
| | RICON 134 | polybutadien | Ricon Resins | | | | | | | | |
| | NIPOL 1312 | butadien acrylontrile copoymer | Zeon Chemical | | | | | | | | |
| | TRILENE 65 | ethylene propylene copolymer | Uniroyal | | | | | | | | |
| | KRATON 1203 | ethylene butylene polymer | Shell | | | | | | | | |

-continued

| | | | | | | | | | | | |
|---|---|---|---|---|---|---|---|---|---|---|---|
| | KRATON 207 | ethylene butylene polymer | Shell | | | | | | | | |
| | VITON A-100 | flouroelastomer | Dupont Dow | | | | | | | | |
| CURABLES | CN 111 | epoxidized soy bean oil acrylate | Sartomer | 29.5 | 29.5 | 29.5 | 29.5 | 29.5 | 29.5 | 29.5 | 29.5 |
| | CL 1039 | urethane monoacylate | UCB Radcure | | | | 10 | | | | |
| OIL/PLASTICIZERS | DURASYN/P104 | 3:2 poly alpha olefin/phenolic resin blend | Arizona Chemical (P104) | | | | | | | | |
| | P 550 | polyester glutarate | C. P. Hall | 20 | 20 | 20 | 20 | 20 | 20 | 20 | 20 |
| | SF96-350 | silicone fluid | GE Silicones | | | | | | | | |
| PHOTOINITIATORS | IRGACURE 819 | trimethylbenzoyl-phenylphosphineoxide | Ciba | | | | | | | | |
| | DAROCURE 1173 | hydroxymethylphenyl-propanone | Ciba | 4 | 4 | 4 | 4 | 4 | 4 | 4 | 4 |
| | IRGACURE 184 | hydroxycyclohexyl-phenylketone | Ciba | | | | | | | | |
| | IRGACURE 500 | 1:1 hydroxycyclohexyl-phenylketone/benzophenone blend | Ciba | | | | | | | | |
| ADDITIVES | LICA 44 | neopentyl-[diallyl]oxy, tri(N-ethylenediamino) ethylzirconate | Kenrich Petro-chemical | | | | | | | | 0.1 |
| | TEXOPHOR SPECIAL | anionic surfactant | Henkel | 2 | 2 | 2 | 2 | 2 | 2 | 2 | 2 |
| | IRGADOR 153 | succinic acid amine salt | Ciba | | | | | | | | |
| | TINUVIN 292 | hindered amine | Ciba | | | | | | | | |
| ANTIOXIDANT | IRGANOX 1010 | hindered phenolic | Ciba | 1 | 1 | 1 | 1 | 1 | 1 | 1 | 1 |
| CORROSION | H-600 | calcium silicate | Huber | 10 | 10 | 10 | 10 | 10 | 10 | 10 | 10 |
| CONTROL | LITHIUM STEARATE | lithium stearate | Reagens | 4 | 4 | 4 | 4 | 4 | 4 | 5 | 5 |
| | BN ZPG | boron nitride | ZYP Coatings | | | | | | | | |
| PIGMENT | RUTILE R900 | TiO$_2$ | Dupont | 0.5 | 0.5 | 0.5 | 0.5 | 0.5 | 0.5 | 0.5 | 0.5 |
| VISCOSITY | GILSONITE | hydrocarbon resin | Lexco | 4 | 4 | 4 | 4 | 4 | 4 | 4 | 4 |
| CONTROL/MISC. | PKHP 200 | phenoxy resin | Phenoxy Specialists | | | | | | | | |
| FILLERS | NYAD G | wallastonite | Nyco | | | | | | | | |
| | TS 610 | treated fumed silica | Cabot | 0 | 2 | 0 | 2 | 0 | 4 | 2 | 2 |
| | BARAGEL 10 | bentonite clay | Elementis | | | | | | | | |
| | F30D | micropheres | Pierce & Stevens | | | | | | | | |
| | TOTAL | | | 105 | 107 | 105 | 107 | 106 | 109 | 108 | 108.1 |

| SAMPLE NO. | | | | 17 | 18 | 19 | 20 | 21 | 22 | 23 | 24 |
|---|---|---|---|---|---|---|---|---|---|---|---|
| RESIN/RUBBER | LUCANT 2000 | ethylene alpha olefin | Mitsui Chemical | | | | | | | | |
| | LUCANT 600 | ethylene alpha olefin | Mitsui Chemical | | | | | | | | |
| | RICON 131 5MA | maleinized poybutadiene | Ricon Resins | | | | | | | | |
| | TRILENE 65/ DURASYN | 1:1 ethylene propylene copolymer/poly alpha olefin blend | Amoco (durasyn) | | | | | | | | |
| | RICON 100 | polybutadien | Ricon Resins | | | | | | | | |
| | RICON 184 | polybutadien | Ricon Resins | 30 | 45 | 45 | | | | | |
| | RICON 134 | polybutadien | Ricon Resins | | | | | | | | |
| | NIPOL 1312 | butadene acryleneamine copoymer | Zeon Chemical | | | | | | | 30 | 30 |
| | TRILENE 65 | ethylene propylene copolymer | Uniroyal | | | | | | | | |
| | KRATON 1203 | ethylene butylene polymer | Shell | | | | | | | | |
| | KRATON 207 | ethylene butylene polymer | Shell | | | | | | | | |
| | VITON A-100 | flouroelastomer | Dupont Dow | | | | | | | | |
| CURABLES | CN 111 | epoxidized soy bean oil acrylate | Sartomer | 29.22 | 29.22 | 29.22 | 58.44 | 58.44 | 58.44 | 33 | 28 |
| | CL 1039 | urethane monoacylate | UCB Radcure | | | | | | | | 10 |
| OILS/PLASTICIZERS | DURASYN/P104 | 3:2 poly alpha olefin/phenolic resin blend | Arizona Chemical (P104) | | | | | | | 25 | 25 |
| | P 550 | polyester glutarate | C. P. Hall | 20 | | | 10 | 10 | 10 | | |
| | SF96-350 | silicone fluid | GE Silicones | | | | | | | | |
| PHOTOINITIATORS | IRGACURE 819 | trimethylbenzoyl-phenylphosphineoxide | Ciba | 2.19 | 2.19 | 2.19 | 4.38 | 4.38 | 4.38 | | |
| | DAROCURE 1173 | hydroxymethylphenyl-propanone | Ciba | 1.61 | 1.61 | 1.61 | 3.22 | 3.22 | 3.22 | | |
| | IRGACURE 184 | hydroxycyclohexyl-phenylketone | Ciba | 0.58 | 0.58 | 0.58 | 1.16 | 1.16 | 1.16 | | |
| | IRGACURE 500 | 1:1 hydroxycyclohexyl-phenylketone/benzophenone blend | Ciba | | | | | | | 8 | 8 |

-continued

| | | | | | | | | | | | |
|---|---|---|---|---|---|---|---|---|---|---|---|
| ADDITIVES | LICA 44 | neopentyl[diallyl]oxy, tri(N-ethylenediamino)-ethylzirconate | Kenrich Petro-chemical | | | | | | | 1 | |
| | TEXOPHOR SPECIAL | anionic surfactant | Henkel | 2 | 2 | 2 | 2 | | | 2 | 2 |
| | IRGACOR 153 | succinic acid amine salt | Ciba | | | | | 4.5 | | | |
| | TINUVIN 292 | hindered amine | Ciba | | | | | | | 5 | 5 |
| ANTIOXIDANT | IRGANOX 1010 | hindered phenolic | Ciba | 0.96 | 0.96 | 0.96 | 1.92 | 1.92 | 1.92 | 0.67 | 1.13 |
| CORROSION | H-600 | calcium silicate | Huber | 10 | 10 | 10 | 10 | 10 | 10 | 9 | 9 |
| CONTROL | LITHIUM STEARATE | lithium stearate | Reagens | 5 | 5 | 5 | 5 | 5 | 4 | 6 | 6 |
| | BN ZPG | boron nitride | ZYP Coatings | | | | | | | | |
| PIGMENT | RUTILE R900 | $TiO_2$ | Dupont | 0.44 | 0.44 | 0.44 | 0.88 | 0.88 | 0.88 | 1.33 | 0.57 |
| VISCOSITY | GILSONITE | hydrocarbon resin | Lexco | 4 | 4 | 4 | 4 | 4 | 4 | | 4 |
| CONTROL/MISC. | PKHP 200 | phenoxy resin | Phenoxy Specialists | | | | | | | 4 | |
| FILLERS | NYAD G | wallastonite | Nyco | | | | | | 2 | | |
| | TS 610 | treated fumed silica | Cabot | 0 | 0 | 0 | 4 | 0 | 0 | | |
| | BARAGEL 10 | bentonite clay | Elementis | | | | | 4 | 4 | 3 | 4 |
| | F30D | micropheres | Pierce & Stevens | | | | | | | | |
| | TOTAL | | | 106 | 101 | 105.5 | 105 | 103 | 104 | 128 | 132.7 |

| SAMPLE NO. | | | | 25 | 26 | 27 | 28 | 29 | 30 | 31 | 32 |
|---|---|---|---|---|---|---|---|---|---|---|---|
| RESIN/RUBBER | LUCANT 2000 | ethylene alpha olefin | Mitsui Chemical | | | | | | | | |
| | LUCANT 600 | ethylene alpha olefin | Mitsui Chemical | | 30 | | | | | | |
| | RICON 131 5MA | maleinized poybutadiene | Ricon Resins | | | | | | | | |
| | TRILENE 65/ DURASYN | 1:1 ethylene propylene copolymer/poly alpha olefin blend | Amoco (durasyn) | | | | | | | | |
| | RICON 100 | polybutadien | Ricon Resins | | | | | | | | |
| | RICON 184 | polybutadien | Ricon Resins | | | | | | | | |
| | RICON 134 | polybutadien | Ricon Resins | 20 | | | | 25 | 35 | 25 | 10 |
| | NIPOL 1312 | butadene acryleneamine copoymer | Zeon Chemical | | | | | | | | |
| | TRILENE 65 | ethylene propylene copolymer | Uniroyal | | | | | | | | 10 |
| | KRATON 1203 | ethylene butylene polymer | Shell | 25 | | | | | | | |
| | KRATON 207 | ethylene butylene polymer | Shell | | | | | | | | |
| | VITON A-100 | flouroelastomer | Dupont Dow | | | | | | | | 10 |
| CURABLES | CN 111 | epoxidized soy bean oil acrylate | Sartomer | 33 | 33 | 61 | 61 | 42.5 | 33 | 42.5 | 49 |
| | CL 1039 | urethane monoacrylate | UCB Radcure | | | | | | | | |
| OILS/PLASTICIZERS | DURASYN/P104 | 3:2 poly alpha olefin/phenolic resin blend | Arizona Chemical (P104) | | 20 | | | | | | |
| | P 550 | polyester glutamate | C. P. Hall | | | | | | | | |
| | SF96-350 | silicone fluid | GE Silicones | | | | | | | | |
| PHOTOINITIATORS | IRGACURE 819 | trimethylbenzoyl-phenylphosphineoxide | Ciba | | | | | | | | |
| | DAROCURE 1173 | hydroxymethylphenyl-propanone | Ciba | | | | | | | | |
| | IRGACURE 184 | hydroxycyclohexyl-phenylketone | Ciba | | | | | | | | |
| | IRGACURE 500 | 1:1 hydroxycyclohexyl-phenylketone/benzophenone blend | Ciba | 10 | 10 | 18 | 18 | 12 | 10 | 10 | 13 |
| ADDITIVES | LICA 44 | neopentyl[diallyl]oxy, tri(N-ethylenediamino)-octylzirconate | Kenrich Petro-chemical | | | | | | | | |
| | TEXOPHOR SPECIAL | anionic surfactant | Henkel | | | | | | | | |
| | IRGACOR 153 | succinic acid amine salt | Ciba | 45 | | | | 5 | 5 | 4 | |
| | TINUVIN 292 | hindered amine | Ciba | | | | | | | | |
| ANTIOXIDANT | IRGANOX 1010 | hindered phenolic | Ciba | 1.17 | 0.67 | 1.5 | 1.5 | 0.8 | 0.67 | 0.8 | 1 |
| CORROSION | H-600 | calcium silicate | Huber | 9 | 9 | 8 | 9 | 8 | 8 | 8 | 4 |
| CONTROL | LITHIUM STEARATE | lithium stearate | Reagens | 5 | 6 | 8 | 6 | 6 | 6 | 6 | 2 |
| | BN ZPG | boron nitride | ZYP Coatings | | | | | | | | |

-continued

| | | | | | | | | | | | |
|---|---|---|---|---|---|---|---|---|---|---|---|
| PIGMENT | RUTILE R900 | TiO$_2$ | Dupont | 1.33 | 1.33 | 2.5 | 2.5 | 1.7 | 1.33 | 1.7 | 1 |
| VISCOSITY | GILSONITE | hydrocarbon resin | Lexco | 4 | 4 | | | | | | |
| CONTROL/MISC. | PKHP 200 | phenoxy resin | Phenoxy Specialists | | | | | | | | |
| FILLERS | NYAD G | wallastonite | Nyco | | | | | | | | |
| | TS 610 | treated fumed silica | Cabot | | | | | | | | |
| | BARAGEL 10 | bentonite clay | Elementis | 2 | 2 | 6 | 5.5 | 2 | 2 | 3 | 4 |
| | F30D | micropheres | Pierce & Stevens | | | | 0.5 | | | | |
| | TOTAL | | | 116 | 115 | 103 | 102.5 | 98 | 101 | 102 | 108 |

MIXING: ALL BATCHES WERE MIXED USING A COWLES DISPERSER. ALL LIQUIDS WERE ADDED FIRST, BLENDED THEN HEATED BETWEEN 120 AND 180 F.. POWDERS WERE THEN ADDED WITH A FINAL BLENDING TAKING 20 MINUTES. TOTAL BATCH MIX TIME LESS THAN 1 HOUR.

EXAMPLE 42

This Example illustrates formation of the inventive compositions in the form of an aerosol spray. The components of the spray are listed below:

| COMPONENT | NAME | AMOUNT | SUPPLIER |
|---|---|---|---|
| Polybutene Oil | H-50 | 61% | Amaco |
| Linseed Oil | OKO S-70 | 5% | |
| Epoxy Resin | Epon SU 2.5 | 15% | Shell |
| Fumed Silica | Cabosil TS-720 | 5% | Cabot |
| Calcium Silicate | Hubersorb 600 | 8% | Huber |
| Li Stearate | | 6% | Witco |

The composition was blended in accordance with Example 7, diluted 50% with naphtha and placed into an aerosol can at loading of 33% of A-31 (A-46 can also be used as a propellant).

The aerosol composition was sprayed at a thickness of 0.02 inch upon a steel panel and tested in accordance with ASTM B-117. The formula was passed the ASTM B-117 test for at least 24 hours.

What is claimed is:

1. A composition comprising a combination comprising:
   at least one synthetic base oil,
   at least one polymer that is at least partially miscible with said at least one base oil,
   at least one silica containing material in an amount effective to thicken the composition.

2. The composition of claim 1 wherein the silica containing material comprises silicon dioxide.

3. The composition of claim 1 wherein the silica containing material comprises at least one member chosen from the group of calcium silicate, potassium silicate and sodium silicate.

4. The composition of claim 1 further comprising an additive selected chosen from the group of polyethylene, polyvinylidene difluoride, polytetrafluoroethylene, polyvinyl fluoride, phosphate esters, dithiophospahates, dithiocarbonates, calcium carbonate, zinc stearate, ammonium molybdate, chlorinated paraffins, graphite, molybolenum disulfide, tungsten disulfide, zinc oxide, borax, boron nitride, tricresyl phosphate, triphenyl phosphorothionate, fatty acid esters; sulfurized or phospite adducted fatty oils, fatty acids, or fatty acid esters.

5. The composition of claim 1 further comprising at least one anti-oxidant chosen from the group of aromatic amines, hindered phenols, diphenylamine, phenyl alpha-naphthylamine, 2,6-di-t-butylphenol, phenothiazine, alkylated diphenylamines, alkylated phenyl alpha-naphthylamines, 2,6-di-t-butyl-p-cresol (BHT), polymeric BHT, peroxide decomposers, or a substituted hydroxyphenyl benzotriazole.

6. The composition of claim 1 further comprising at least one photoinitiator.

7. The composition of claim 1 further comprising an amount of at least one propellant effective to form an aerosol spray.

8. The composition of claim 7 wherein said base oil comprises polybutene oil, said polymer comprises an epoxy, said thickener comprises calcium silicate, said propellant comprises at least one hydrocarbon and further comprising at least one solvent.

9. The composition of claim 6 wherein said at least one polymer comprises at least one member chosen from the group of polybutadiene, ethylene propylene copolymer and a fluoroelastomer.

10. The composition of claim 6 wherein the base oil comprises at least one member chosen from the group of silicone oil, polyalphaolefin and polyester glutarate.

11. The composition of claim 6 further comprising at least one of epoxidized soybean oil and urethane monoacrylate.

12. The composition of claim 6 further comprising titanium dioxide and at least one member chosen from the group of calcium silicate, potassium silicate and sodium silicate.

13. The composition of claim 1 further comprising at least one member chosen from the group of gilsonite, bentonite clay, silica and wallastonite.

14. A composition comprising a combination comprising:
   at least one synthetic base oil,
   at least one polymer that is at least partially miscible with said at least one base oil,
   at one thickener comprising an effective amount of at least one silica containing material, and;
   at least one photoinitator.

15. The composition of claim 14 comprising a combination comprising ethylene alpha olefin, epoxidized soy bean oil, at least one thickener and at least one photoiniator.

16. The composition of claim 14 comprising a combination comprising polybutadiene, epoxidized soy bean oil, at least one thickener and at least one photoiniator.

17. The composition of claim 15 further comprising urethane monoacrylate.

18. The composition of claim 14 comprising a combination comprising butadiene acrylonitrile copolymer, epoxidized soy bean oil, at least one thickener and at least one photoiniator.

19. The composition of claim 14 comprising a combination comprising polybutene oil, linseed oil, epoxy resin and at least one thickener.

20. The composition of claim 1 further comprising at least one member selected from the group consisting of soap greases, soap complexed greases and mineral oil greases, vegetable oil based greases, organo-clay greases, plyurea greases, and polyurea complexed greases.

* * * * *